United States Patent
Sundholm

(10) Patent No.: US 11,498,756 B2
(45) Date of Patent: Nov. 15, 2022

(54) METHOD FOR HANDLING MATERIAL IN A MATERIAL CONVEYING SYSTEM, A SEPARATING DEVICE ARRANGEMENT AND A MATERIAL CONVEYING SYSTEM

(71) Applicant: Maricap Oy, Vantaa (FI)

(72) Inventor: Göran Sundholm, Tuusula (FI)

(73) Assignee: Maricap Oy, Vantaa (FI)

(*) Notice: Subject to any disclaimer, the term of this patent is extended or adjusted under 35 U.S.C. 154(b) by 0 days.

(21) Appl. No.: 17/287,180

(22) PCT Filed: Oct. 11, 2019

(86) PCT No.: PCT/FI2019/050729
§ 371 (c)(1),
(2) Date: Apr. 21, 2021

(87) PCT Pub. No.: WO2020/084190
PCT Pub. Date: Apr. 30, 2020

(65) Prior Publication Data
US 2021/0387802 A1    Dec. 16, 2021

(30) Foreign Application Priority Data
Oct. 22, 2018 (FI) .................. 20185883

(51) Int. Cl.
*B65F 5/00* (2006.01)
*B65F 1/10* (2006.01)
(Continued)

(52) U.S. Cl.
CPC .............. *B65F 5/005* (2013.01); *B65F 1/105* (2013.01); *B65G 53/52* (2013.01); *B65G 53/60* (2013.01)

(58) Field of Classification Search
CPC ................... B65G 43/10; B65F 5/005
See application file for complete search history.

(56) References Cited

U.S. PATENT DOCUMENTS 3,771,294 A * 11/1973 Ronning ............... B65G 53/60
                                                     55/460
3,933,393 A *  1/1976 De Feudis ............ B65F 5/005
                                                    406/130
(Continued)

FOREIGN PATENT DOCUMENTS

CN    103708701 A    4/2014
CN    108146912 A    6/2018
(Continued)

OTHER PUBLICATIONS

International Search Report for International Patent Application No. PCT/FI2019/050729 dated Dec. 20, 2019, 6 pages.
(Continued)

*Primary Examiner* — Joseph A Dillon, Jr.
(74) *Attorney, Agent, or Firm* — Merchant & Gould P.C.

(57) ABSTRACT

A method for handling material and conveying air in a pneumatic conveying system for material, which conveying system comprises at least one input point (1) for material, a material conveying pipe (100), which is connectable to an input point (1), and at least two separating devices (10A, 10B), in which the material being conveyed is separated from the conveying air, and also means for bringing about a pressure difference and/or a transporting air flow in the conveying pipe (100) at least during the conveyance of material, which means comprise at least one partial-vacuum source (21). In the method, material is conveyed in a transporting air flow in a material conveying pipe from an input point in a selected manner into one of at least two separating devices (10A, 10B), and that at least one of the aforementioned separating devices (10A, 10B) is configured to function as the standby separating device of a second separating device. The object of the invention is also a (Continued)

separating device arrangement and a waste conveying system.

36 Claims, 6 Drawing Sheets

(51) Int. Cl.
*B65G 53/52* (2006.01)
*B65G 53/60* (2006.01)

(56) References Cited

U.S. PATENT DOCUMENTS

| | | | | |
|---|---|---|---|---|
| 3,951,461 A * | 4/1976 | De Feudis | ............... | B65F 5/005 406/10 |
| 4,013,551 A * | 3/1977 | de Feudis | ............... | B65F 5/005 193/34 |
| 4,076,321 A * | 2/1978 | Haight | ............... | B65F 5/005 406/117 |
| 4,099,457 A * | 7/1978 | Hyden | ............... | B65F 5/005 100/249 |
| 4,108,498 A * | 8/1978 | Bentsen | ............... | B65F 5/005 137/614.21 |
| 4,423,987 A * | 1/1984 | Powers | ............... | B03B 9/06 406/173 |
| 4,589,592 A * | 5/1986 | Wassdahl | ............... | B65F 5/005 406/127 |
| 4,674,418 A * | 6/1987 | Schafer | ............... | C10J 3/78 55/346 |
| 4,913,597 A * | 4/1990 | Christianson | ............... | B65G 53/24 406/173 |
| 4,993,882 A * | 2/1991 | Nishizuka | ............... | E04F 17/10 406/84 |
| 4,995,765 A * | 2/1991 | Tokuhiro | ............... | B65F 5/005 406/84 |
| 5,083,704 A * | 1/1992 | Rounthwaite | ............... | B65F 5/005 43/64 |
| 5,147,152 A * | 9/1992 | Link | ............... | B65G 53/24 406/33 |
| 7,886,402 B2 * | 2/2011 | Kihlstrom | ............... | B65F 5/005 15/301 |
| 8,366,802 B2 * | 2/2013 | Olsson | ............... | B01D 19/0063 95/1 |
| 9,242,808 B2 * | 1/2016 | Sundholm | ............... | B65G 53/24 |
| 9,434,541 B2 * | 9/2016 | S.Ratnam | ............... | B65F 5/00 |
| 9,434,542 B2 * | 9/2016 | Sundholm | ............... | B65F 5/005 |
| 9,533,839 B2 * | 1/2017 | Nierescher | ............... | B65F 5/005 |
| 9,708,138 B2 * | 7/2017 | Veselov | ............... | B65G 53/60 |
| 9,896,265 B2 * | 2/2018 | Sundholm | ............... | B65F 1/105 |
| 2003/0221398 A1 * | 12/2003 | Trautmann | ............... | B04C 5/28 55/346 |
| 2010/0307537 A1 * | 12/2010 | Sundholm | ............... | B65G 53/24 15/300.1 |
| 2011/0097159 A1 * | 4/2011 | Haberl | ............... | B65F 5/005 406/15 |
| 2011/0290619 A1 * | 12/2011 | S.Ratnam | ............... | B65F 5/005 198/736 |
| 2012/0201614 A1 * | 8/2012 | Sundholm | ............... | B65F 5/005 406/168 |
| 2013/0078042 A1 * | 3/2013 | Sundholm | ............... | B65F 5/005 406/41 |
| 2013/0089380 A1 * | 4/2013 | Arrabal | ............... | B65F 5/005 406/117 |
| 2015/0191308 A1 * | 7/2015 | Sundholm | ............... | B65F 1/1447 406/173 |
| 2017/0166409 A1 * | 6/2017 | Sundholm | ............... | B65G 53/06 |
| 2019/0255794 A1 * | 8/2019 | Bishop | ............... | B24B 55/06 |
| 2019/0374895 A1 * | 12/2019 | Hidalgo Castado | ............... | B01D 46/4227 |
| 2021/0387802 A1 * | 12/2021 | Sundholm | ............... | B65F 1/105 |

FOREIGN PATENT DOCUMENTS

| | | |
|---|---|---|
| ES | 2 245 535 A1 | 1/2006 |
| FI | 124175 B | 4/2014 |
| JP | 3345825 B2 | 11/2002 |
| WO | WO 2011/110740 A2 | 9/2011 |
| WO | WO 2011/151522 A1 | 12/2011 |
| WO | WO 2012/117146 A1 | 9/2012 |
| WO | WO 2014/029903 A1 | 2/2014 |
| WO | WO 2014/135746 A1 | 9/2014 |
| WO | 2011/042599 A2 | 4/2022 |

OTHER PUBLICATIONS

Written Opinion of the International Searching Authority for International Patent Application No. PCT/FI2019/050729 dated Dec. 20, 2019, 8 pages.
Chinese Office Action for CN Application No. 201980069362.7 dated Aug. 17, 2022 (16 pages, with English translation).
Extended European Search Report for EP Application No. 19875840.1 dated Sep. 7, 2022 (7 pages).

* cited by examiner

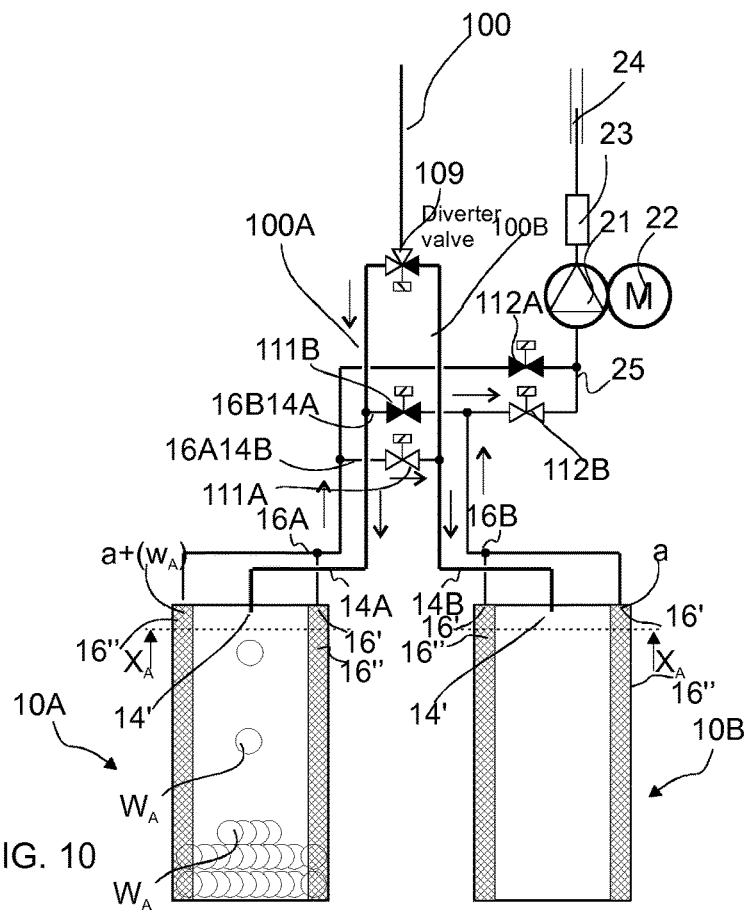
FIG. 10
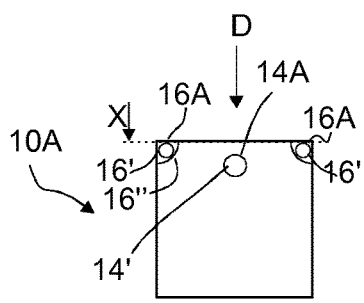
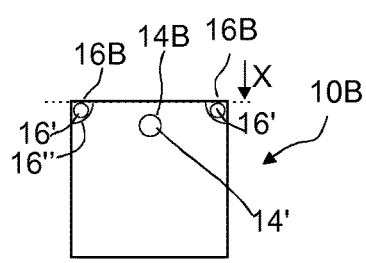
FIG. 10a
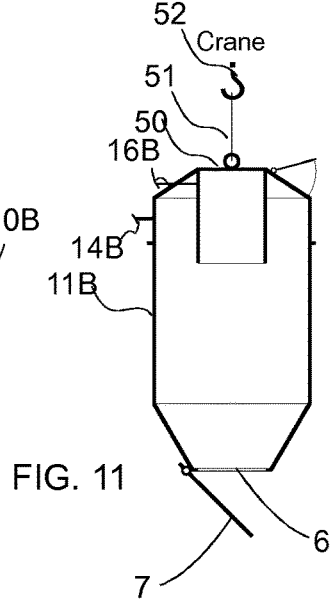
FIG. 11
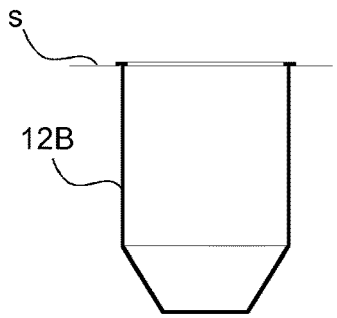

METHOD FOR HANDLING MATERIAL IN A MATERIAL CONVEYING SYSTEM, A SEPARATING DEVICE ARRANGEMENT AND A MATERIAL CONVEYING SYSTEM

This application is a National Stage Application of PCT/FI2019/050729, filed 11 Oct. 2019, which claims benefit of Serial No. 20185883, filed 22 Oct. 2018 in Finland, and which applications are incorporated herein by reference. To the extent appropriate, a claim of priority is made to each of the above disclosed applications.

The invention relates generally to pneumatic material conveying systems, such as to partial-vacuum conveying systems, more particularly to the collection and conveying of waste material or recycleable material, such as to the conveying of household wastes.

Systems wherein wastes are conveyed in piping by means of suction and/or conveying air are known in the art. In these systems, wastes are moved long distances in the piping pneumatically, by means of suction and/or a pressure difference, together with the conveying air. The apparatuses are used for, inter alia, the conveying of wastes in different institutions, for the conveying of household waste, or for the conveying of other waste. It is typical to these systems that a partial-vacuum apparatus is used to bring about a pressure difference, in which apparatus a partial vacuum is brought about in the conveying pipe with partial-vacuum generators, such as with vacuum pumps or with an ejector apparatus. A conveying pipe typically comprises at least one valve means, by opening and closing which the replacement air coming into the conveying pipe is regulated. One of the convenient solutions of new regional building projects is waste management that will operate with a pipe conveying system. In these solutions, sorted wastes are sucked along underground pipes to a waste station that is common to the whole region. The system is clean, odorless and noise-free, and is also a more environmentally friendly solution than conventional waste management and a safer solution from the viewpoint of the immediate surroundings. In waste stations there is typically a separating device in which the material being conveyed is separated from the conveying air, which in turn is conducted into an outlet pipe via a possible filter. Typically, a number of separating devices and/or material containers, into which the material being conveyed is conducted, are used in relatively small systems. Such devices and/or containers are used e.g. when more than one material fraction is intended to be conveyed, or when the volume of the amount of material to be conveyed becomes such that it is sensible to use more than one separating device and/or material container. In pneumatic material conveying systems, in which e.g. household waste or recycleable material is conveyed, one problem sometimes is that material particles that are light in weight but large in surface area, such as loose papers or plastic, are not necessarily separated from the conveying air in the separating device, but instead reach the filter after the separating device in the downstream direction of the conveying air. Consequently, it is e.g. possible that more filters are needed or that a filter becomes blocked. Attempts have been made to arrange various solutions to this problem, but often the problem is their unsuitability to small systems.

The aim of the present invention is to provide a new type of solution in connection with material conveying systems, by means of which solution the drawbacks of solutions known in the art are avoided. Another aim of the invention is to provide a solution for, in particular, relatively small systems in which it is endeavored to reduce the number of components, e.g. the use of various filters, without compromising the functionality of the systems. Yet another aim of the invention is to provide a solution in which the emptying of input points pneumatically and the emptying of a collection container can be performed flexibly, and even independently of each other.

BRIEF DESCRIPTION OF THE INVENTION

The invention is based on a concept wherein material is conveyed in a transporting air flow in a material conveying pipe from an input point in a selected manner into one of at least two separating devices in such a way that at least one of the aforementioned separating devices is configured to function as the standby separating device of a second separating device. The conveying air, and the material particles possibly remaining in it, that has passed through the first separating device is conducted into this separating device acting as a standby separator. In the separating device arrangement presented, the first and the second separating device can be intended to function primarily as a separating device for different materials or for the same material.

The method according to the invention is characterized by what is disclosed in the characterization part of claim 1.

The method according to the invention is also characterized by what is disclosed in claims 2-20.

The separating device arrangement according to the invention is characterized by what is disclosed in claim 21.

The separating device arrangement according to the invention is also characterized by what is disclosed in claims 22-35.

The waste conveying system according to the invention is characterized by what is disclosed in the characterization part of claim 36.

The solution according to the invention has a number of important advantages. By means of the invention the drawbacks of prior-art solutions can be avoided.

By using a separating device arrangement according to one embodiment of the invention, the separation of material particles from the conveying air in the standby separating device can be improved. It is thereby possible to significantly improve the prevention of the material to be separated from displacing along with the conveying air via the standby separating device of the separating device arrangement towards the output channel leading to the suction side of the partial-vacuum source. In this case, e.g. waste particles, such as papers or plastic films or bags, can be more effectively made to remain in the separating devices of the separating device arrangement. Thus, an operationally reliable separating device arrangement for a pneumatic waste conveying system can be achieved. In the separating device of the separating device arrangement according to one embodiment of the invention, the flow of conveying air in the chamber space of the separating device or in the output channel can be acted upon by bringing about a guiding effect for the conveying air in the opposite direction with respect to its direction of rotation. With this, it is further possible to significantly improve prevention of the material to be separated from displacing along with the conveying air from the container space of the separating device towards the output channel. In this case, e.g. waste particles, such as papers or plastic films or bags, do not easily get into the output aperture of the separating device and/or block the output aperture, and an operationally reliable separating device for use in the separating device arrangement can be achieved. The desired effect can be brought about by arranging an output branch in the wall of the output channel in such a way that a flow of the conveying air from the output channel into the output branch is brought about in a mainly tangential direction with respect to the wall of the output channel. This can be achieved e.g. by arranging the output branch eccentrically in the output channel. The separating device arrangement according to the invention is suited both to material conveying systems in which a formatter, i.e. a rotary shaper, is used to compact and/or shape the material to be conducted into the conveying piping from the input points, and to ordinary pneumatic pipe conveying systems for material wherein material is fed in from an input point directly into the conveying piping. By using a deep collection container as a separating device, the material conveyed into the collection container can be efficiently stored, and emptying of the container can be performed less frequently. Emptying of the collection container can be performed by lifting the collection container, and by transferring the material that has collected in the container from an openable and closable aperture arranged in the bottom part of the container into the container of a transportation means, such as of a garbage truck. The transportation means can comprise a press for compressing the material so it becomes denser and a hoist for lifting the collection container. With the solution according to the invention, the separating device of a pneumatic pipe conveying system for material and the collection container intended for temporary storage of the material conveyed can be efficiently combined. When the collection container is a so-called deep collection container, which is at least partly embedded below the surface level of the ground, or corresponding surface level, the space requirement can be efficiently reduced. By arranging most of the volume of the collection container below the surface of the ground, and a relatively small part to be the visible part, a very environmentally suitable solution for a collection container is achieved. Owing to the large volume and the dimensions of the container, the collected material settles, i.e. compacts, in which case relatively more material fits into the collection container than it would into many small containers. When the collection container is arranged deep in the ground, the deep collection container remains colder in the summer, in which case any odor nuisance possibly caused by wastes is less. According to one preferred embodiment the deep collection container-separating device comprises a collection container and an external container, into which the collection container is arranged and from which the collection container is lifted for emptying. A separating device can be used in the separating device arrangement according to the invention, which device also gives the possibility for feeding in, via an openable and closable input aperture formed in the collection container, the type of material that is not, e.g. owing to its size or other properties, suited for conveying in a pneumatic pipe conveying system for material. According to an embodiment of the invention, it is also conceivable that the partial-vacuum source arranged in the proximity of the deep collection separating device, or separating devices, is e.g. an immobile suction pump container or corresponding, with which the air flow/partial vacuum for conveying material from input points into the separating device is handled. This solution is particularly suitable in situations in which there are a number of interconnected deep collection separating devices. The solution according to the invention offers the possibility to use an existing garbage truck, or corresponding, for emptying the collection container of the deep collection separating device. The solution according to the invention also easily enables a solution wherein the separating devices are disposed in different locations, such as outdoors, and the partial-vacuum generator and associated apparatus in an inside space of a building. A mobile partial-vacuum generating apparatus can be used effectively in connection with a material conveying system comprising the deep collection separating device of the invention to bring about the partial vacuum needed in the pneumatic conveying of material. In this case, a dedicated, fixed, partial-vacuum generating apparatus is not needed in individual material conveying systems. The system thus enables the division of effective operating time of the partial-vacuum source between a number of material conveying systems. The solution according to the invention effectively enables a different frequency for operation of the partial-vacuum source and for the emptying of a container. The separating device arrangement according to the invention is suited for use in connection with many different types of separating devices. Various containers in which material is separated from the conveying air can be used in the arrangement. The containers can be dependent on the point of application in terms of their shape and dimensions. A separating device and/or material containers can be used that are detachably fastened to material conveying pipes and to the pipes for circulating conveying air via the separating devices and/or material containers.

BRIEF DESCRIPTION OF THE FIGURES

In the following, the invention will be described in more detail by the aid of an embodiment with reference to the attached drawings, wherein FIG. 10 presents one embodiment of the separating device arrangement according to the invention, as a simplified diagram and partially sectioned from the direction of the arrow D of FIG. 10a along the line X-X, FIG. 10a presents a container of a separating device of the separating device arrangement of FIG. 10 sectioned along the line Xa-Xa of FIG. 10, FIG. 11 presents a simplified representation of the emptying of a container of a separating device according to one embodiment of the invention.

DETAILED DESCRIPTION OF THE INVENTION

In the figures, a form of presentation has been used for the valves wherein an open pathway through a valve is presented with a white marking for the valve, and a closed pathway with a black marking for the valve. In addition, in a figure the diagrammatic directions of movement of conveying air a and/or materials in different operating states are presented with arrows. In the text, the term 'pipe', 'channel' or 'branch' can mean generally a material pathway, or a part thereof, and/or a conveying air pathway, or a part thereof. A pathway can typically be e.g. a pipe or hose.

In the following, the operation of one separating device is first presented at a general level with the aid of FIG. 1, which presents one partially-sectioned separating device 10B of a pneumatic material conveying system. The separating device 10B is operatively adapted to be connected to a material conveying pipe 100B of a pneumatic material conveying system, via which pipe the material $W_B$ is conducted along with the conveying air a into the separating device 10B from the input aperture 14'. In the separating device 10B, the material $W_B$ being conveyed is separated from the conveying air a. The separating device 10B is operatively adapted to be connected to a device bringing about the transporting air flow of the pneumatic material conveying system, such as to a partial-vacuum generator 21, to a fan, to a pump device or corresponding, to the suction side of it, e.g. via a suction pipe 25. The separating device 10B comprises an input aperture 14', into which the conveying pipe 100B of the material conveying system is operatively connectable, e.g. via the input branch 14B. According to one embodiment, the separating device 10B can comprise switching means for operatively connecting the material conveying pipe to the input aperture of the separating device. According to one embodiment, the switching means can comprise an input branch 14B, and also a connection means 15B with which the material conveying pipe 100B is operatively connectable, e.g. via an input branch, to the input aperture 14' of the separating device.

Figure 1:
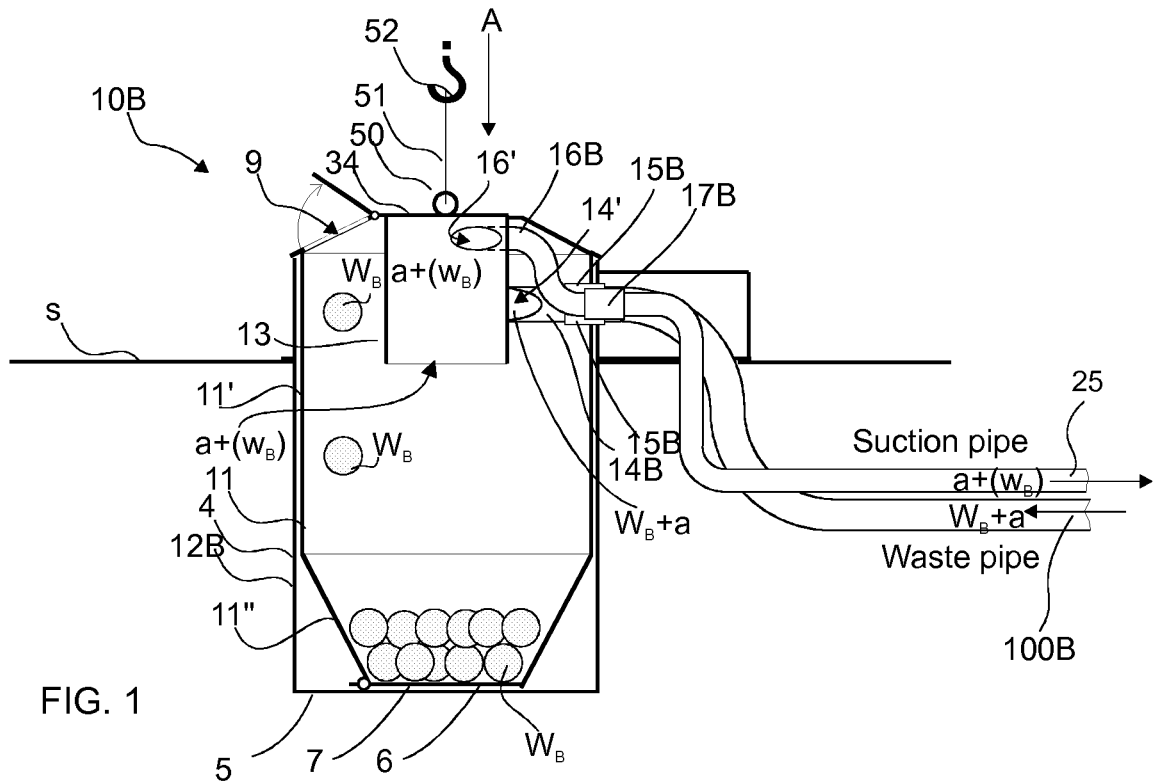
FIG. 1 presents an embodiment of a separating device arrangement according to one embodiment of the invention, partially sectioned in the vertical plane along the line I-I FIG. 2.

According to one embodiment, such as in the embodiment of FIG. 1, the collection container 11B of the separating device 10B is a so-called cyclone separator comprising a chamber space that is bounded by side walls 11', 11", a base in which can be e.g. a bottom hatch 7 and an upper end wall 34. The separating device can also be another type of separating device. For example, FIGS. 10 and 10a present a separating device of another type. The chamber space of the collection container 11B of the separating device 10B can be broader at its top part, e.g. mainly cylindrical, and the chamber space can narrow, e.g. conically, in the bottom part towards the base. In the separating device can be a material output aperture 6 and a hatch 7 opening and closing the aperture. The material output aperture 6 can also be arranged elsewhere, e.g. in the wall of the separating device. In the embodiment of FIG. 1, the output aperture 6 for material is arranged in the bottom part of the separating device, e.g. in its base. An input aperture 14' can be connected to the wall of the collection container 11B of the separating device, to the top part 11' of it, via which input aperture the material $W_B$ to be conveyed, such as waste material, is conducted together with the conveying air a into the chamber space of the collection container of the separating device. The input aperture 14' can be arranged in the wall of the chamber space of the collection container of the separating device, e.g. in the top part 11' of its side wall.

The input aperture 14' of the collection container 11B can, as in the embodiment of FIG. 1, be arranged e.g. in the wall of the separating device, in the top part 11' of said wall, in the area between the end wall 34 and the bottom part of the wall 13 of the output channel extending into the inside part of the separating device. In the separating device 10B, the collection container 11B can thus comprise a ring-like section in the aforementioned area, in which the wall 13 of the output channel forms the inner rim of the ring-like section and the wall 11' of the collection container, typically the top part of the wall, forms the outer rim of the ring-like section.

The conveying air a is conducted from the separating device from the output aperture 16' for the conveying air. The conveying air is typically deflected in the separating device, in which case the heavier material accompanying the conveying air separates from the conveying air more easily.

The input branch 14B and the input aperture 14' can be, such as e.g. in the embodiment of the figures, arranged in the wall 11' of the collection container 11B in such a way that the conveying air a and the solid particles $W_B$ (i.e. the material) are fed into a mainly tangential movement in the collection container 11B, in the top part of it. Centrifugal force and gravity keep the heavy particles near the side wall of the collection container of the separating device, in a rotational motion, in which case the material descends to the base of the collection container.

The separating device 10B can, according to one embodiment, be a so-called deep collection container, which comprises in one embodiment an external container 12B and a collection container 11B. The external container 12B can be e.g. a pit or a container arranged in the ground or in the soil, said pit or container having a base 5 and a side wall 4. The external container 12B extends from surface level s downwards for some distance. In the embodiment of FIG. 1, a separate collection container 11B, which is fitted into the external container 12B, is arranged for the external container. In the embodiment of the figure, the top part of the collection container 11B extends to above surface level s.

In one embodiment, the wall part 13 of the output channel can be arranged in the top part of the collection container 11B of the separating device, which wall part extends into the chamber space of the separating device. The wall part 13 can be tubular, e.g. cylindrical as in the embodiment of the figure. The wall part 13 can be on the same axis as (coaxial with) the vertical axis of the collection container 11B of the separating device. An output channel is formed on the inside of the rim of the wall part 13, into which output channel the aperture of the bottom part of the wall 13 leads, which aperture can open into the container space. There is a connection from the top part of the output channel via the output aperture 16' to the output branch 16B for the conveying air.

In the embodiment of the figures, the lower end of the tubular wall part 13 is thus open. The upper end of the tubular wall part 13 is closed. The wall part 13 extends from its top end to the end wall 34 or in some cases to outside it. The output branch 16B is, in the embodiment of FIGS. 1 and 2, arranged in the collection container 11B of the separating device in such a way that the conveying air is exhausted in a mainly tangential movement from the top part of the collection container 11B.

A tangential movement is brought about for the outgoing conveying air a (which in some cases can contain material particles $w_B$) in the output channel bounded by the wall part 13, which movement is preferably in the opposite direction with respect to the tangential movement of the conveying air (and the particles transported along with it) ($W_B$+a), in the collection container 11B of the separating device. The tangential movement (rotational motion) brought about for conveying air to be discharged is preferably in the opposite direction to the tangential movement of the conveying air (and the particles transported along with it) ($W_B$+a) arriving in the chamber space, at least with respect to the tangential movement occurring in the proximity of the input branch 14B. The movement of the conveying air in the separating device is roughly illustrated with arrows, e.g. in the figures in which an arrow a+($w_B$) presents the movement from the separating device of the conveying air, and the particles ($w_B$) possibly still remaining in the conveying air and traveling along with it, leaving the separating device, and $W_B$+a presents the movement of the conveying air, and material particles intended to be separated, coming into the separating device at least in the proximity of the input aperture.

The tangential movement of the outgoing conveying air can thus be opposite with respect to the rotation direction of the tangential movement of the conveying air coming into the separating device from the input branch 14 via the input aperture 14'. In this case, the rotating movement of the incoming conveying air from the chamber space of the separating device 10B is neutralized in the output channel 13, or in the proximity of it, and the speed of the conveying air decelerates. It is endeavored with this procedure to prevent fairly well the easy ascent of detrimental particles, such as paper and plastic, along with the conveying air from the chamber space of the separating device 10B of the separating device into the output channel 13.

Figure 2:
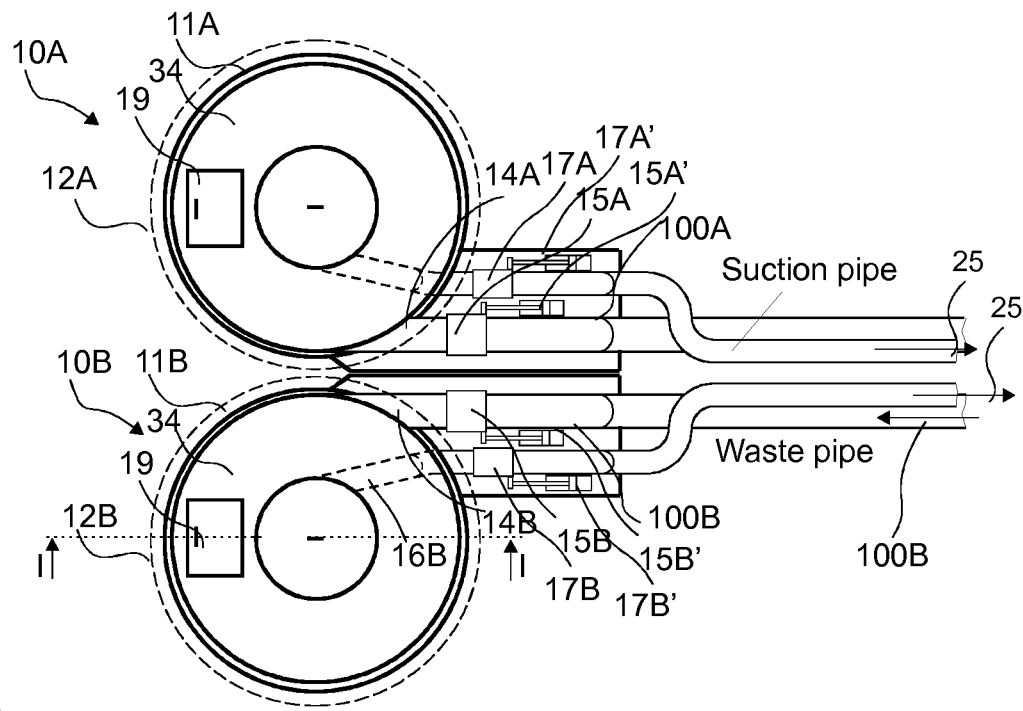
FIG. 2 presents an embodiment of a separating device arrangement according to one embodiment of the invention, as viewed from above, i.e. from the direction of the arrow A of FIG. 1.

Since it is possible that some material particles still remain in the conveying air, a separating device arrangement is applied to solve this problem, in which arrangement a second separating device is utilized that can be intended primarily as a standby separating device of the first separating device for a second material fraction. In FIG. 2 and also thereafter, numbering has been used wherein the letter A after a reference number describes the components of a first separating device 10A, and the letter B after a reference number describes the components of a second separating device 10B.

FIG. 2 presents one embodiment in which are two separating devices, a first separating device 10A and a second separating device 10B, presented from the direction of the arrow A of FIG. 1. The markings presented above in FIG. 1, in which reference is made to a (second) separating device 10B and to its components, can also be used in conjunction with a first separating device 10A, in which case the letter B is exchanged for the letter A in the reference numbers.

FIG. 2 presents an embodiment wherein two separating devices 10A, 10B are arranged to be operatively connected to the material conveying pipe 100. A valve means 109 is arranged in the material conveying pipe, with which valve means the input of material can be guided into either the first separating device 10A or into the second separating device 10B. From the valve means 109, on the side of the separating device, are two pipe branches 100A, 100B, the first branch of which can be operatively connected to the input branch 14A of the collection container 11A of the first separating device 10A. The second branch 100B can be operatively connected to the input branch 14B of the collection container 11B of the second separating device 10B. The embodiment of FIG. 2 can be applied e.g. in a situation in which there are two different fractions $W_A$, $W_B$ in the material being conveyed, in which case a part of the material (the first material $W_A$) being conveyed from the input points 1 (FIGS. 8 and 9) is emptied into the collection container 11A of the first separating device 10A and the second part of the material (the second material $W_B$) coming from the input points is emptied into the collection container 11B of the second separating device 10B. According to a second embodiment, the separating devices 10A, 10B of FIG. 2 can be used to provide more capacity, in which case the emptying interval of the containers can be lengthened. In this case, when the first container 11A of the separating device separating device 10A fills, the material coming from the conveying pipe 100 can be guided with the valve means 109 into the container 11B of the second separating device 10B.

The first separating device 10A and/or the second separating device 106 can be detachably connected in connection with the material conveying pipe 100, 100A, 1006 and/or with the channel 25 leading to the suction side of the partial-vacuum source. A connecting means 15A, 15B could be arranged between the conveying pipe 100A, 1006 and the input channel 14A, 14B. The connecting means 15A, 15B and the input channel 14A, 14B can together form e.g. a snap-on coupling. The connecting means 15A, 15B can be e.g. a sleeve that is movable between two positions, a first position in which there is a connection between the conveying pipe 100A, 1006 and the input channel 14A, 14B, and a second position in which the input channel 14A, 14B is detachable from the connection. A second connecting means could be arranged in connection with the channel 25 leading to the suction side of the partial-vacuum source and the output channel 16A, 16B of the separating device. The connecting means 17A, 17B and the output channel 14A, 14B together form e.g. a snap-on coupling. The connecting means can be e.g. a sleeve that is movable between two positions, a first position in which there is a connection between the channel 25 leading to the suction side of the partial-vacuum generator and the output channel 16A, 16B, and a second position in which the output channel 16A, 16B is detachable from the connection. The connecting means can be used e.g. with an actuator 15A', 15B', 17A', 17B'.

According to one embodiment, the external container 12A, 12B of the separating device 10A, 106 is embedded below the surface S of the ground or corresponding. All the levels from which material can be dropped into the container and, correspondingly, from which the emptying of the container can be performed can be regarded as a corresponding surface. The walls of the external container 12A, 12B are vertical and formed from a cylindrical container of steel or other material, such as reinforced plastic, that is closed at the bottom and open at the top. The container is preferably sunk into the ground, into a cavity made for the purpose, in such a way that most of the volume of the container is situated below the surface S of the ground. In the embodiment of FIG. 1, the side wall 4 of the external container continues to above the surface S of the ground. In the embodiment of the figure, the cross-sectional area of the external container on the horizontal plane is constant, but it can be increasingly larger on the horizontal plane going upwards, in which case the external container expands slightly upwards in a conical manner.

Figure 8:
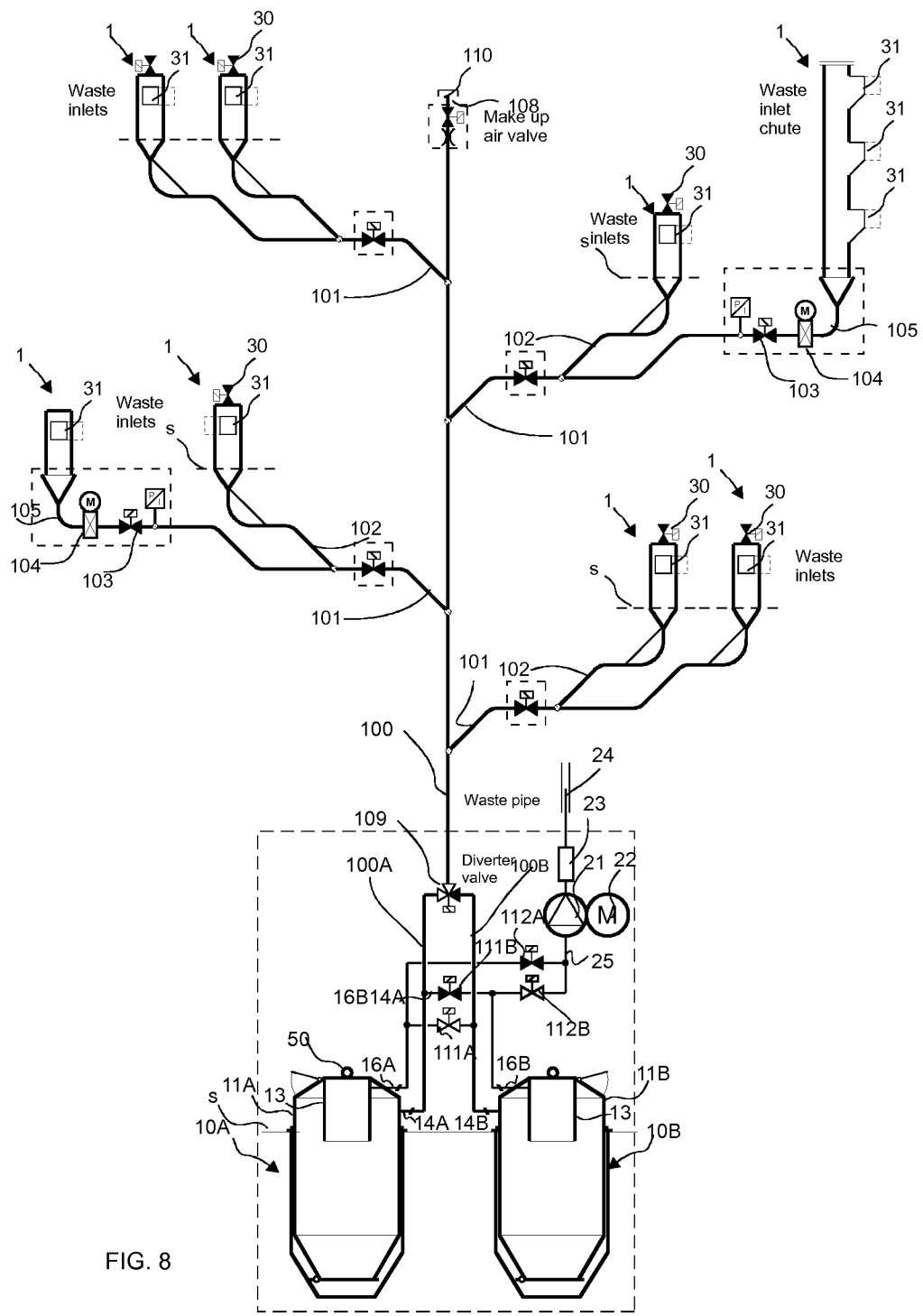
FIG. 8 presents a simplified diagram of one system applicable to the separating device arrangement according to the first embodiment of the invention.
Figure 9:
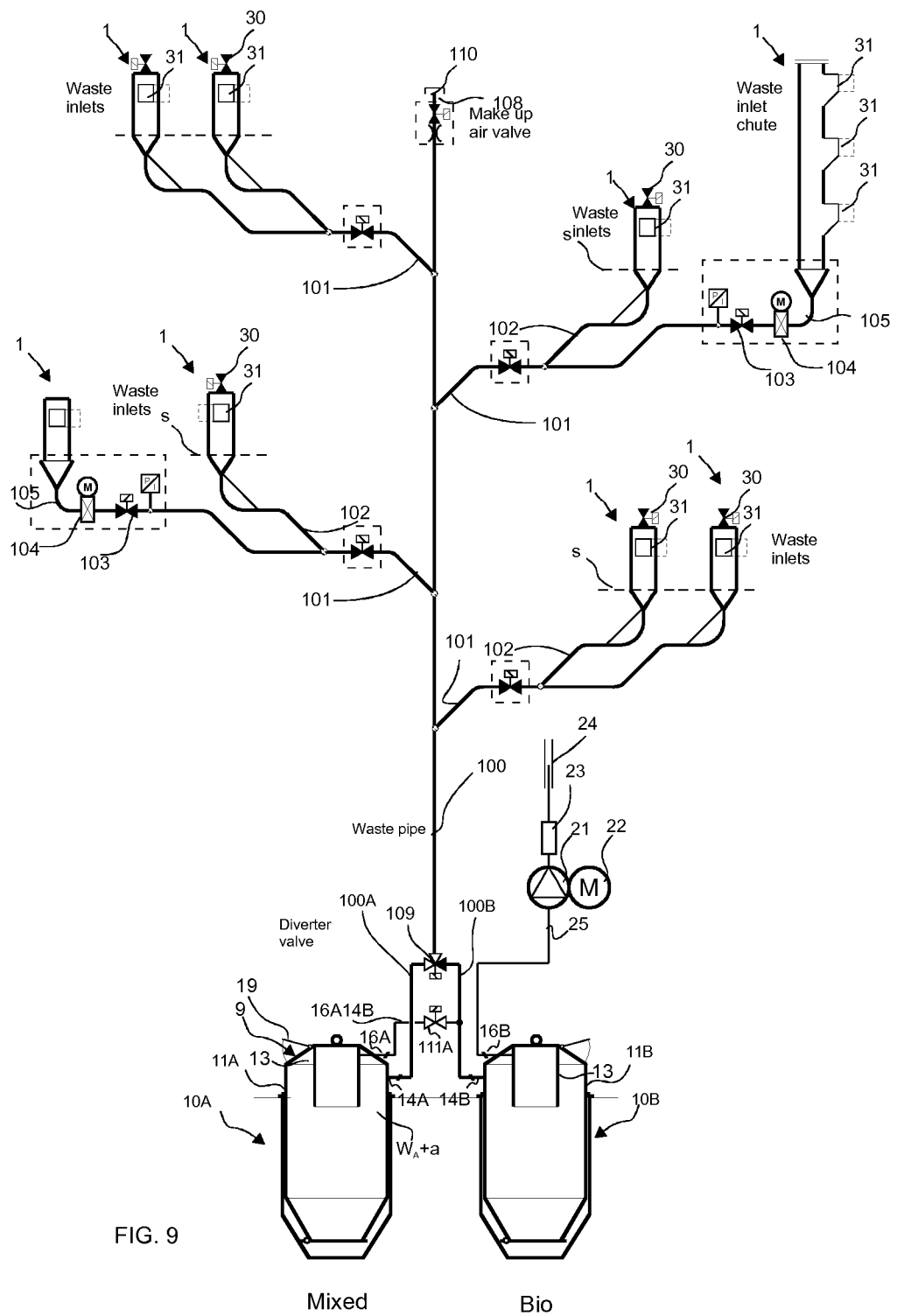
FIG. 9 presents a simplified diagram of one system applicable to the separating device arrangement according to the second embodiment of the invention.

FIGS. 8 and 9 present a part of a pneumatic material conveying system, which part comprises a material conveying pipe 100, along the side of which at least one, typically many, input points 1 are arranged. An input point 1 is a feed-in station of material, more particularly of waste material, intended for conveying, from which station the material, more particularly waste material, such as household waste, or recycleable material intended for conveying, is fed into the conveying system. An input point 1 can also be a refuse chute, into which material is fed from input apertures on different floors of a building. The system can comprise a number of input points 1, from which the material intended for conveying is fed into conveying piping 100, 101, 102. By opening and closing a shut-off means, such as a valve means 103, that is possibly in connection with an input point, material can be conveyed from the input point 1 into the conveying pipe 100. The input point 1 is connected on the valve side to the conveying pipe 100 or to an input pipe 101, 102 in connection with it. Typically conveying piping comprises a main conveying pipe 100, to which it has been possible to connect a number of branch conveying pipes 101, and in turn to which branch conveying pipes it has been possible to connect a number of feed-in stations 1. In the embodiment of FIGS. 8 and 9, an input point 1 can be waste material input points 1 disposed on the surface of the ground, in which input points are one or more input apertures 31 that are typically openable and closable with a hatch. The input point 1 can be connected via a feeder channel 105 to a material shaper 104, which shapes and compacts the material to suit the conveying piping 100, 101, 102, which is smaller in diameter than the feeder channel. The solution according to the invention is also suited to those types of material conveying systems in which material shapers are not used, but instead the material is conveyed from input points directly into the conveying piping. The conveying piping can be arranged to travel underground. In the embodiment of FIGS. 8 and 9, the conveying piping can comprise at least one replacement air duct 110, in which a replacement air valve 108 is arranged. Arrangements (e.g. valve means 30) for the regulated feed-in of replacement air into the conveying piping can be in the input points 1, or in their proximity.

The material conveying pipe 100 of the conveying piping is connectable in an interchangeable manner either to the material conveying pipe 100A leading to the first separating device 10A or to the material conveying pipe 100B leading to the second separating device 10B.

In the method according to one embodiment, material and conveying air are handled in a pneumatic material conveying system. The conveying system comprises at least one input point 1 for material, into which the material to be conveyed is fed in from the input aperture 31 and conveyed along with the conveying air in the material conveying pipe 100, which is connectable to an input point 1. In the conveying system are at least two separating devices 10A, 10B, in which the material being conveyed is separated from the conveying air. The conveying system further comprises means for bringing about a pressure difference and/or a conveying air current in the conveying pipe 100 at least during conveyance of the material. The means comprise at least one partial-vacuum source 21 and means for the regulated feed-in of replacement air into the conveying piping. In the method, material can be conveyed in a transporting air flow in a selected manner into one of at least two separating devices 10A, 10B. In the method, at least one of the aforementioned separating devices 10A, 10B is configured to function as the standby separating device of a second separating device. In this case, any material that has possibly traveled in the conveying air through the first separating device is conducted, together with the conveying air, from the output aperture 16' of the first separating device into the material input aperture of the second separating device (standby separating device) and is separated from the conveying air in the second separating device.

According to one embodiment, the first separating device 10A and the second separating device 10B are configured to be operatively connected in an interchangeable manner in such a way that the second separating device 10B can function as a standby separating device for the first separating device 10A, and/or, that the first separating device 10A can function as a standby separating device for the second separating device 10B.

Figure 3:
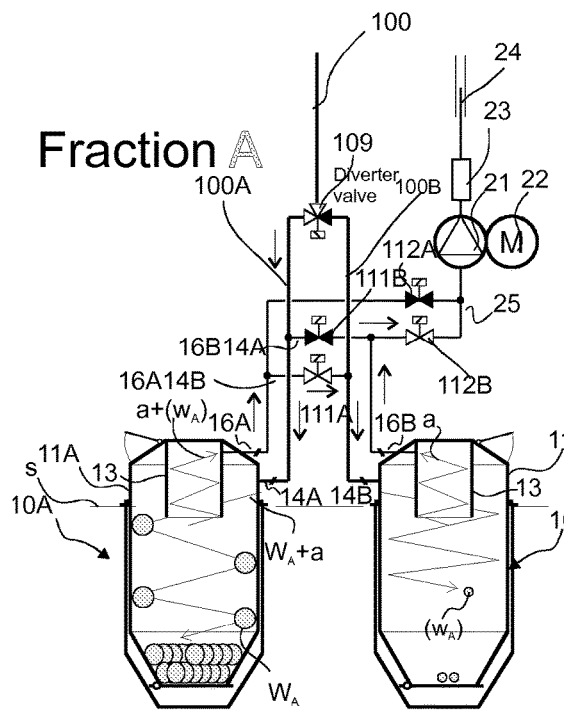
FIG. 3 presents a separating device arrangement according to a first embodiment of the invention, in a first operating state and partially sectioned in the vertical plane along the line III-III of FIG. 4.
Figure 4:
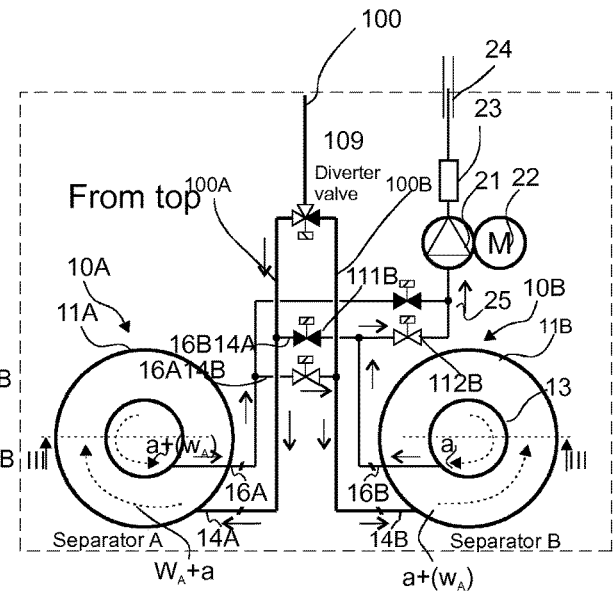
FIG. 4 presents a simplified and diagrammatic view of a separating device arrangement according to the first embodiment of the invention, from above, i.e. from the direction of the arrow B of FIG. 4.

In one embodiment, the first separating device 10A and the second separating device 10B can be configured to be operatively connected (consecutively) in such a way that the second separating device 10B can function as a standby separating device for the first separating device 10A, in which case the input channel 14A of the first separating device can be operatively connected to the material conveying pipe 100 and the output channel 16A for conveying air of the first separating device 10A can be operatively connected via the material pathway 16A14B to the input channel 14B of the second separating device 10B. The output channel 16B for conveying air of the second separating device 10B can be operatively connected to the channel 25 leading to the suction side of the partial-vacuum source 21 of the pneumatic material conveying system. Such an embodiment or operating state is presented e.g. in FIGS. 3, 6, 8, 9, and 10. In this case, the material $W_A$ conducted into the first separating device separates from the conveying air and remains in the first separating device 10A. The conveying air a, and any material particles ($w_A$) possibly traveling along with it that have remained in the transporting air flow, is conducted via the output aperture 16' and output channel 16A of the first separating device 10A, via the material pathway 16A14B and the input channel 14B of the second separating device 10B, into the input aperture 14'. In the second separating device 10B (in the standby separator), the material $w_A$ that remained in the transporting air flow is separated again from the conveying air a, which leaves from the second separating device 10B via the output aperture 16'. At least some of the conveying air can be conducted, e.g. as in FIG. 3, into the outward blowing pipe 24, or e.g. into the material conveying pipe to circulate again.

Figure 5:
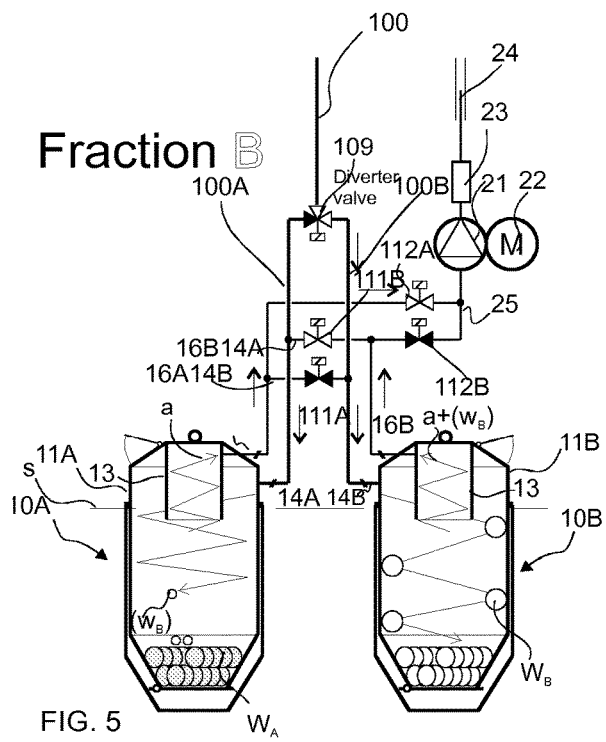
FIG. 5 presents a separating device arrangement according to the first embodiment of the invention, in a second operating state and partially sectioned in the vertical plane.

In one embodiment, the second separating device 10B and the first separating device 10A can be configured to be operatively connected (consecutively) in such a way that the first separating device 10A can function as a standby separating device for the second separating device 10B, in which case the input channel 14B of the second separating device 10B can be operatively connected to the material conveying pipe 100 and the output channel 16B for conveying air of the second separating device 10B can be operatively connected via the material pathway 16B14A to the input channel 14A of the first separating device 10A. The output channel 16A for conveying air of the first separating device 10A can be operatively connected to the channel 25 leading to the suction side of the partial-vacuum source 21 of the pneumatic material conveying system. Such an embodiment or operating state is presented e.g. in FIG. 5. In this case, the material $W_B$ conducted into the second separating device 10B from the material conveying pipe 100 separates from the conveying air and remains in the second separating device 10B. The conveying air a, and any material particles ($w_B$) possibly traveling along with it that have remained in the transporting air flow, is conducted via the output aperture 16' and output channel 16B of the second separating device 10B, via the material pathway 16B14A, via the input channel 14A of the first separating device 10A, into the input aperture 14' of the first separating device 10A. In the first separating device 10A (in the standby separating device), the material $w_B$ that remained in the transporting air flow is separated again from the conveying air a, which leaves from the first separating device 10A via the output aperture 16'. At least some of the conveying air can be conducted e.g. as in FIG. 5, into the outward blowing pipe 24, or e.g. into the material conveying pipe to circulate again.

According to one embodiment, the first separating device 10A and the second separating device 10B can be configured to be operatively connected consecutively in an interchangeable manner in such a way that the second separating device 10B can function as a standby separating device for the first separating device 10A, in which case the input channel 14A of the first separating device can be operatively connected to the material conveying pipe 100 and the output channel 16A for conveying air of the first separating device 10A can be operatively connected to the input channel 14B of the second separating device 10B and the output channel 16B for conveying air of the second separating device 10B can be operatively connected to the channel 25 leading to the suction side of the partial-vacuum source 21 of the pneumatic material conveying system, or, that the first separating device 10A can function as a standby separating device for the second separating device 10B, in which case the input channel 14B of the second separating device 10B can be operatively connected to the material conveying pipe 100 and the output channel 16B for conveying air of the second separating device 10B can be operatively connected to the input channel 14A of the first separating device 10A and the output channel 16A for conveying air of the first separating device 10A can be operatively connected to the channel 25 leading to the suction side of the partial-vacuum source 21 of the pneumatic material conveying system. This embodiment and operating state is realizable e.g. with the separating device arrangements presented e.g. in FIGS. 3-5, 8 and 10.

In one embodiment, material pathways 100A, 100B are arranged between the material conveying pipe 100 and the input channel 14A of the first separating device and also between the material conveying pipe and the input channel 14B of the second separating device 10B, which material pathways are provided with at least one valve means 109 in such a way that the pathway from the material conveying pipe 100 to the input channel 14A of the first separating device 10A via the first material pathway 100A and/or to the input channel 14B of the second separating device 10B via the second material pathway 100B is openable and closable. The valve means 109 can be e.g. a diverter valve. With the at least one valve means 109 the input of material can be guided from the conveying pipe 100 into either the first separating device 10A or into the second separating device 10B, depending on the position of the at least one valve means.

In one embodiment, pathways are arranged between the channel 25 leading to the suction side of the partial-vacuum source 21 and the output channel 16A for conveying air of the first separating device 10A, and also between the channel 25 and the output channel 16B for conveying air of the second separating device 10B, which pathways are provided with a valve means 112A, 112B in such a way that the pathway from the channel 25 leading to the suction side of the partial-vacuum source to the output channel 14A for conveying air of the first separating device 10A and/or to the output channel 14B for conveying air of the second separating device 10B is openable and closable. Such an embodiment or operating state is presented e.g. in FIGS. 3-5, 8 and 10. In this case, the suction side of the partial-vacuum generator can be connected to act via the first separating device or via the second separating device.

Figure 6:
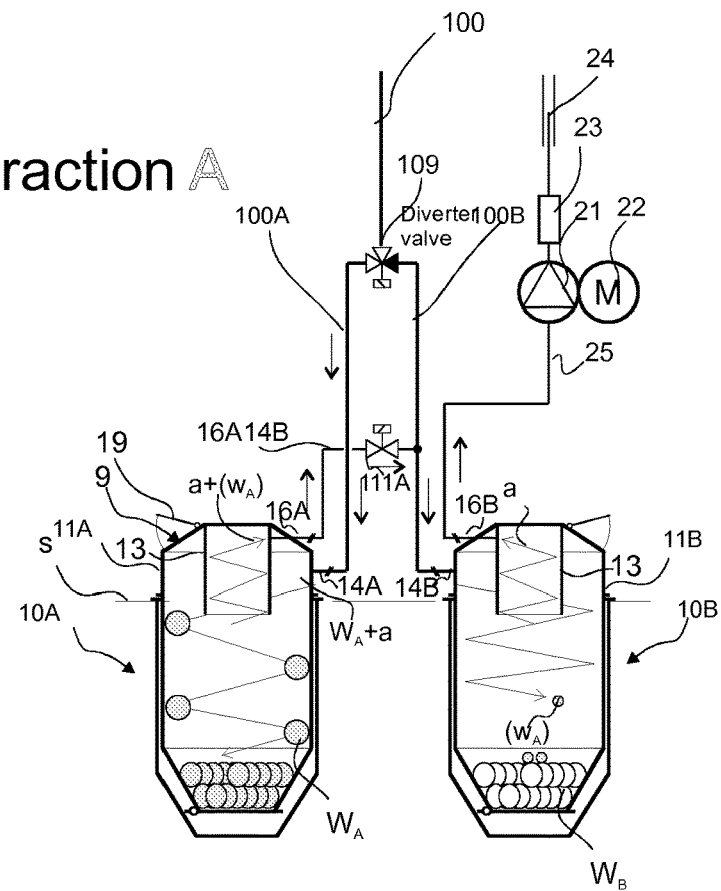
FIG. 6 presents a simplified and diagrammatic view of a separating device arrangement according to a second embodiment of the invention, in a first operating state and partially sectioned in the vertical plane.
Figure 7:
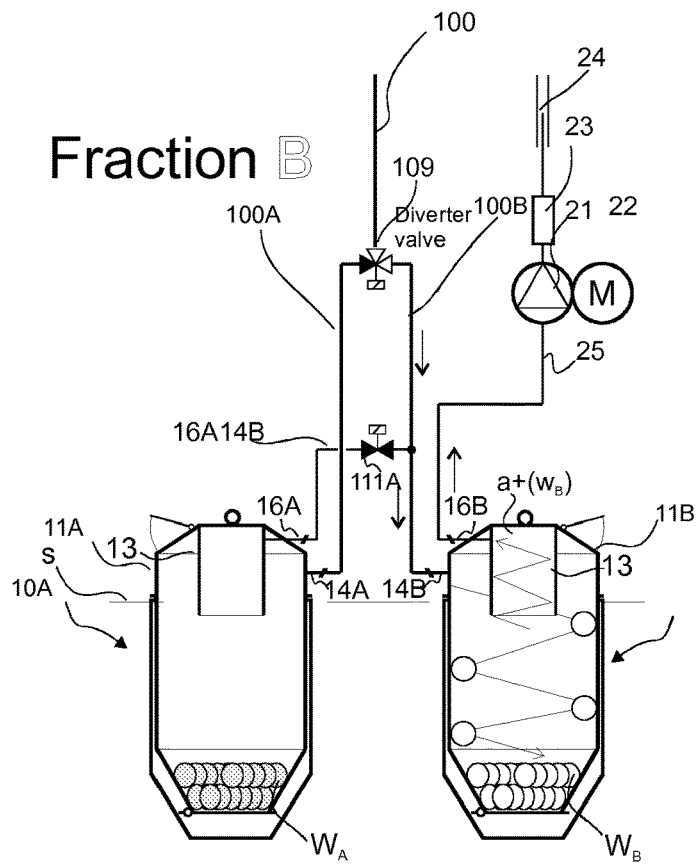
FIG. 7 presents a simplified and diagrammatic view of a separating device arrangement according to the second embodiment of the invention, in a second operating state and partially sectioned in the vertical plane.

According to one embodiment, a valve means 111A is arranged in the pathway 16A14B in the input channel 14B of the second separating device 10B from the output channel 16A for conveying air of the first separating device 10A. Such an embodiment or operating state is presented e.g. in FIGS. 3-10. When the valve 111A is open, a transporting air flow can travel from the output channel 16A for conveying air of the first separating device 10A into the input channel 14B of the second separating device, when the suction side of the partial-vacuum source 21 is connected to act in the output channel 16B for conveying air of the second separating device 10B and the connection from the material conveying pipe 100 to the input channel 14A of the first separating device is open. In this case, e.g. the first material $W_A$ can be conveyed from the input points via the conveying pipe into the first separating device 10A, when the second separating device 10B is functioning as a standby separating device for the first separating device. Such an operating state is presented e.g. in FIGS. 3, 4, 8 and 10. In the embodiment of FIGS. 6 and 9, a corresponding solution is also presented wherein the second separating device 10B can function as a standby separating device for the first separating device, when the valve 11A is open. In the embodiment according to FIGS. 6 and 9 the first separating device 10A and the second separating device 10B are operatively connected consecutively when the material $W_A$ is intended to be conveyed from the conveying pipe 100 into the first separating device. In the embodiment of FIG. 7, the first separating device 10A is not configured to function as a standby separating device for the second separating device 10B. In such a case a simplified separating device arrangement can be used, in which there is no pathway from the output channel 16B of the second separating device into the input aperture of the first channel, but instead there is a pathway from the output channel of the second separating device into the channel 25 leading to the suction side of the partial-vacuum source 21.

According to one embodiment, a valve means 111B is arranged in the pathway 16614A in the input channel 14A of the first separating device 10A from the output channel 16B for conveying air of the second separating device 10B. Such an embodiment or operating state is presented e.g. in FIGS. 3-5, 8 and 10. When the valve 111B is open, a transporting air flow can travel from the output channel 16B for conveying air of the second separating device 10B into the input channel 14A of the first separating device, when the suction side of the partial-vacuum source 21 is connected to act in the output channel 16A for conveying air of the first separating device 10A and the connection from the material conveying pipe 100 to the input channel 14B of the second separating device is open. In this case, e.g. the second material $W_B$ can be conveyed from the input points via the conveying pipe into the second separating device 10B, when the first separating device 10A is functioning as a standby separating device for the second separating device. Such an operating state is presented e.g. in FIG. 5.

According to one embodiment, the first separating device 10A and/or the second separating device 10B is a cyclone separator in terms of its operating principle. Such embodiments are presented e.g. in FIGS. 1-9. There are other types of cyclone separators, and the invention is not limited merely to the embodiments presented in the figures.

According to one embodiment, the first separating device 10A and/or the second separating device 10B is a separator container. Such an embodiment is presented e.g. in FIGS. 10 and 10a. There are other types of separator containers, and the invention is not limited merely to the embodiments presented in the figures. The first separating device 10A and second separating device 10B of FIG. 10 are presented in FIG. 10a as a cross-section, in which the arrow D is from the direction of the top wall of the container. An input aperture 14' and at least one output aperture 16' are formed or arranged in the end wall of the separating device. There can be also more output apertures 16' in a separating device, e.g. two, as in the embodiments of FIGS. 10, 10a. The input aperture 14' of the first separating device 10A is connectable to the input channel 14A of the second separating device and the input aperture 14' of the second separating device 10B to the input channel 14B of the second separating device. At least one output aperture 16' of the first separating device 10A is connectable to an output channel 16A of the first separating device. At least one output aperture 16' of the second separating device 10B is connectable to an output channel 16B of the second separating device. A means 16" limiting the access of material into the output aperture from the container space of the separating device can, as in the embodiment of FIGS. 10, 10a, be arranged in connection with at least one output aperture 16'. The means 16" limiting the access of material from the container space of the separating device into the output aperture 16' can be such that it allows the transporting air flow through but prevents the passage of at least some of the solid material particles from the container space into the output aperture 16'. According to one embodiment, the means limiting the access of material from the container space of a separating device into the output aperture 16' is e.g. a wall, in which are formed apertures, a grille or a net. According to one embodiment, the means 16" limiting the access of material from the container space of a separating device into the output aperture 16' is e.g. tubular or forms a channel e.g. with the walls of the separating device. In the embodiment of FIG. 10a, an output aperture 16' can be arranged in the top part of the container of the separating device 10A, 10B, e.g. in the proximity of the corner between the top wall and the side wall. According to one embodiment, the input aperture 14' is arranged in the top part of the container of the separating device, e.g. in the end wall. The input aperture can be arranged e.g. in the same wall as the output aperture 16', as in FIGS. 10, 10a. In the embodiment according to FIGS. 10, 10a the material conducted into the separating device travels from the input aperture 14' to the base of the container space of the separating device and the conveying air leaves from the output aperture 16'. In this case, the material $W_A$ conducted into the first separating device separates from the conveying air and remains in the first separating device 10A. The conveying air a, and any material particles ($w_A$) possibly traveling along with it that have remained in the transporting air flow, is conducted via at least one output aperture 16' and output channel 16A of the first separating device 10A, via the material pathway 16A14B and the input channel 14B of the second separating device 10B, into the input aperture 14'. In the second separating device 10B (in the standby separator), the material $w_A$ that possibly remained in the transporting air flow is separated again from the conveying air a, which leaves from the second separating device 10B via at least one output aperture 16'. Correspondingly, material can be conveyed from the conveying pipe into the second separating device 10B, in which case the first separating device can function as a standby separating device, as is presented above in conjunction with the separating device arrangement according to FIG. 5.

The separating device 10A, 10B can be e.g. a replaceable container. A filled separating device 10A, 10B is taken away to be emptied, e.g. with a means of transport. An empty separating device is exchanged for the filled one.

According to one embodiment, the downstream separating device in the direction of travel of the conveying air, i.e. the standby separating device, receives material particles that have traveled along with the conveying air through the upstream separating device in the direction of travel of the conveying air, and separates these particles from the conveying air. In this case, the exhaust air, i.e. conveying air (and possible material particles) of the upstream separating device are therefore conducted through the second separating device, i.e. through the standby separating device.

FIGS. 6, 7 and 9 present embodiments wherein a second separating device 10B (which is intended for a second type of material $W_B$) is adapted to be used always as a standby separating device for the first separating device 10A (and for the type of material $W_A$ to be conducted into it). In these embodiments of FIGS. 6, 7 and 9, a standby separator is not adapted to be used for the second separating device 10B, but instead in them the exhaust air is conducted from the output aperture 16' to the pathway 25 leading to the output branch 16B of the second separating device and to the suction side of the partial-vacuum generator 21. The exhaust air can be conducted via the partial-vacuum generator, possibly via a sound diffuser and/or a filter 23, e.g. into the outward blowing pipe 24, or it can be circulated back into the material conveying pipe.

When the first type of material $W_A$, which is intended to be conducted into the first separating device 10A, uses a standby separating device, which in this case is the second separating device 10B, then, e.g. when the type of material $W_A$ intended to be conveyed into the first separating device 10A is e.g. mixed waste or paper or plastic, the second separating device 10B intended for the second type of material $W_B$ is used as a standby separating device. The second type of material can be a type of material differing from the first type of material, e.g. biowaste, mixed waste, or also in some cases the same type of material.

According to one embodiment, the first separating device 10A and/or the second separating device 10B is a deep collection container-separating device, into which material is conveyed along with the conveying air from input points 1 via a conveying pipe 100, by means of suction/a pressure difference brought about by a partial-vacuum source 21. According to one embodiment, the collection container 11A, 11B of the separating device functions as a cyclone separator. According to one embodiment, the collection container 11A, 11B of the separating device 10A, 10B is lifted in the emptying phase with lifting means 50, 51, 52. The material that has collected in the collection container 11A, 11B is emptied via an openable and closable aperture 6 arranged in the bottom part of the collection container 11A, 11B. A hatch 7 hinged e.g. on the container could be arranged to cover the aperture 6. FIG. 11 presents a simplified representation of the emptying phase.

According to one embodiment, in the method the collection container 11A, 11B of a separating device 10A, 10B is emptied into the container space of a transport means, in which container space the material can possibly be further compressed to be denser, and which transport means transports the material away.

According to one embodiment, the first and/or second collection container 11A, 11B of a separating device is lifted in the emptying phase from the external container 12A, 12B, in which it is at least partly, and after the emptying phase the emptied collection container 11A, 11B is lowered back into the external container 12A, 12B.

According to one embodiment, material can be fed into the collection container 11A, 11B of a separating device 10A, 10B also directly, from an input aperture 9 arranged in the top part of the container. The feed aperture is typically an opening and closing aperture, a hatch 19 being arranged to close it. The hatch 19 can be e.g. hinged to the top part of the separating device, e.g. to the upper end wall 34 i.e. to the lid part.

According to one embodiment, in the method material is fed into a conveying pipe 100 from the input points 1 for material, which are the input points for waste material or recycleable material, such as waste receptacles or refuse chutes.

According to one embodiment, the material conveying system is a waste conveying system.

The invention also relates to a separating device arrangement for a pneumatic material conveying system, in which material conveying system material is intended to be conveyed in a transporting air flow in a selected manner into one of at least two separating devices 10A, 10B. The separating device arrangement is configured to comprise at least two separating devices 10A, 10B. In each separating device 10A, 10B is an input aperture 14' for material and for the conveying air, and an output aperture for conveying air 16'. The separating device arrangement comprises switching means for conducting the transporting air flow and material of the material conveying pipe 100 from the conveying pipe 100 in a selected manner into the input aperture 14' of each separating device 10A, 10B. The separating device arrangement further comprises means for connecting the suction aperture 16' of the separating device to the suction side of the partial-vacuum source 21. At least one of the aforementioned separating devices 10A, 10B is configured to function as the standby separating device of a second separating device.

According to one embodiment, the first separating device 10A and the second separating device 10B can be configured to be operatively connected consecutively in such a way that the second separating device 10B is configured for functioning as a standby separating device for the first separating device 10A. In this case, the input channel 14A leading to the input aperture 14' of the first separating device can be configured to be operatively connected to the material conveying pipe 100 and the output channel 16A leading from the output aperture 16' for conveying air of the first separating device 10A can be configured to be operatively connected via the material pathway 16A14B to the input channel 14B leading to the input aperture of the second separating device 10B and the output channel 16B leading from the output aperture 16' for conveying air of the second separating device 10B can configured to be operatively connected to the channel 25 leading to the suction side of the partial-vacuum source 21 of the pneumatic material conveying system.

According to one embodiment, the second separating device 10B and the first separating device 10A can be configured to be operatively connected consecutively in such a way that the first separating device 10A is configured to function as a standby separating device for the second separating device 10B. In such a case, the input channel 14B leading to the input aperture of the second separating device 10B can be configured to be operatively connected to the material conveying pipe 100. The output channel 16B leading from the output aperture 16' for conveying air of the second separating device 10B can be configured to be operatively connected via the material pathway 16614A to the input channel 14A leading to the input aperture of the first separating device 10A. The output channel 16A leading from the output aperture 16' for conveying air of the first separating device 10A can configured to be operatively connected to the channel 25 leading to the suction side of the partial-vacuum source 21 of the pneumatic material conveying system.

According to one embodiment, the first separating device 10A and the second separating device 10B are configured to be operatively connected consecutively in an interchangeable manner. In such a case, the second separating device 10B can be configured to function as a standby separating device for the first separating device 10A, or the first separating device 10A can be configured to function as a standby separating device for the second separating device 10B.

According to one embodiment, the second separating device 10B can be configured to function in an interchangeable manner as a standby separating device for the first separating device 10A. In this case, the input channel 14A leading to the input aperture 14' of the first separating device can be configured to be operatively connected to the material conveying pipe 100. The output channel 16A leading from the output aperture 16' for conveying air of the first separating device 10A is configured to be operatively connected to the input channel 14B leading to the input aperture of the second separating device 10B. The output channel 16B leading from the output aperture 16' for conveying air of the second separating device 10B can configured to be operatively connected to the channel 25 leading to the suction side of the partial-vacuum source 21 of the pneumatic material conveying system. When the first separating device 10A can be configured to function in an interchangeable manner as a standby separating device for the second separating device 10B, then the input channel 14B leading to the input aperture of the second separating device 10B can be configured to be operatively connected to the material conveying pipe 100. The output channel 16B leading from the output aperture 16' for conveying air of the second separating device 10B can be configured to be operatively connected to the input channel 14A leading to the input aperture 14' of the first separating device 10A and the output channel 16A leading from the output aperture 16' for conveying air of the first separating device 10A can configured to be operatively connected to the channel 25 leading to the suction side of the partial-vacuum source 21 of the pneumatic material conveying system.

According to one embodiment, a first material pathway 100A is arranged between the material conveying pipe 100 and the input channel 14A connecting to the input aperture 14' of the first separating device 10A. A second material pathway 100B is arranged between the material conveying pipe 100 and the input channel 14B connecting to the input aperture of the second separating device 10B. At least one valve means 109 is arranged in the material pathway between the conveying pipe 100 and the separating device 10A, 10B in such a way that the pathway from the material conveying pipe 100 to the input channel 14A of the first separating device 10A and/or to the input channel 14B of the second separating device 10B is openable and closable. With the position of the valve means, the passage of material from the conveying pipe can be selected into either the first separating device 10A or into the second separating device 10B. The valve 109 is e.g. a diverter valve. The valve 109 can be e.g. a three-way valve. Instead of, or in addition to, a valve means 109, e.g. a three-way valve, also separate valve means can be arranged in the first channel 100A and/or in the second channel 100B.

According to one embodiment, a valve means 111A can be arranged in the material pathway 16A14B arranged between the output channel 16A leading from the output aperture 16' for conveying air of the first separating device 10A and the input channel 14B leading to the input aperture 14' of the second separating device 10B. In this case, the exhaust air (conveying air) of the first separating device, and the material particles possibly remaining in it, can be conducted to the second separating device, when the valve 111A is open.

According to one embodiment, a valve means 111B can be arranged in the material pathway 16614A arranged between the output channel 16B leading from the output aperture 16' for conveying air of the second separating device 10B and the input channel 14A leading to the input aperture of the first separating device 10A. In this case, the exhaust air (conveying air) of the second separating device, and the material particles possibly remaining in it, can be conducted to the first separating device, when the valve 111B is open.

According to one embodiment, a pathway can be arranged between the channel 25 leading to the suction side of the partial-vacuum source 21 and the output channel 16A leading from the output aperture for conveying air of the first separating device 10A and/or between the channel 25 and the output channel 16B leading from the output aperture for conveying air of the second separating device 10B, which pathway can be provided with a valve means 112A, 112B in such a way that the pathway from the channel 25 leading to the suction side of the partial-vacuum source 21 to the output channel 16A connecting to the output aperture 16' for conveying air of the first separating device 10A and/or to the output channel 16B connecting to the output aperture 16' for conveying air of the second separating device 10B is openable and closable.

According to one embodiment, the partial-vacuum source 21 can be arranged in connection with the separating devices, in the proximity of them. According to another embodiment the partial-vacuum source 21 is arranged at a distance from the separating devices, e.g. in a space arranged in a building. In this case, the separating devices can be arranged outdoors and the partial-vacuum generator indoors. The exhaust air of the outward blowing pipe can be arranged e.g. in a vertical flue of a building. The top end of the outward blowing pipe 24 can be situated e.g. on the roof of the building.

According to yet another embodiment, the partial-vacuum generator 21 can be a movable device or a movable apparatus arranged in a mobile means, e.g. in a vehicle. The mobile means can be e.g. a small lorry or a van, or the partial-vacuum source 21 can be arranged in a trailer, which can be towed by a vehicle. The partial-vacuum source 21 can comprise a pump unit, in which is a partial-vacuum generator, such as a vacuum pump, and the drive device 22 driving it. The suction side of the partial-vacuum generator is connected in a first operating state to the collection container of the first and/or second separating device via a medium pathway. In this case, the suction/pressure difference needed in the conveyance of material can be brought about in the collection container 11A, 11B and in the conveying piping 100, 100A, 100B.

In the embodiment of FIGS. 3, 4, 5, 6, 7, the material $W_A$, $W_B$, such as waste material, separated from the conveying air drifts to the bottom part of the collection container 11A, 11B of each separating device 10A, 10B under the effect of gravity. In the figures, the drifting of the separated material to the bottom part of the collection container 11A, 11B of each separating device 10A, 10B is described with an arrow. The material $W_A$, $W_B$ is described in the figures as simplified balls. The separated material is removed, e.g. according to need, from the collection container, e.g. via a material output aperture 6 arranged in the bottom part of the collection container 11A, 11B of each separating device 10A, 10B, e.g. by opening the hatch 7 closing the output aperture 6.

For the material removal phase, the collection container 11A, 11B can be lifted from the external container 12A, 12B with lifting means 50, 51, 52 (the hoisting device itself is not presented), into the container of e.g. a transport means, such as a garbage truck, e.g. via a material output aperture 6 arranged in the bottom part of the collection container 11A, 11B, e.g. by opening the hatch 7 closing the output aperture 6. FIG. 11 presents the lifting of a collection container from the external container.

The conveying air a is conducted from each separating device 10A, 10B with an output branch 16A, 16B for conveying air. The conveying air is typically deflected in the separating device, in which case the heavier material accompanying the conveying air separates from the conveying air more easily.

When the suction side of the partial-vacuum generator 21 is connected directly, or via a conveying air duct, to the container 11A, 11B of the first or second separating device, to which the delivery end of a conveying pipe 100 is in turn operatively connected, a partial vacuum is brought about in the conveying pipe 100. In this case, the suction acts in the conveying pipe 100 via the medium pathway connecting to the container of the separating device. A feed valve 103 can be between the main conveying pipe 100 and the branch conveying pipe 101 and an input point 1, which valve is open in this operating state. In this case, the suction is able to act also in the feeder channel 105 of an input point 1 and in a possible shaper device 104. In this case, the material batch intended to be conveyed is conveyed into the input pipe, into the branch conveying pipe 101 and onwards into the main conveying pipe 100. Possible replacement air comes into the conveying pipe e.g. via the input point 1, e.g. when opening the valve 103 or valve 30, into the conveying pipe. When the valve 103, 30 of an input point is closed, the valve 108 of the replacement air duct 110 can be opened for receiving replacement air into the conveying pipe 100.

The waste material is conveyed along the conveying piping 101, 100, 100A or 100B to the container 11A or 11B of the separating device, where the conveying air a separates from the material and the material remains in the collection container 11A or 11B.

The input points 1 are emptied according to the emptying sequence or according to need.

The collection container 11A, 11B can be arranged in a space bounded by the walls 4, 5 of the external container 12A, 12B. When the joint 15A, 15A' or 15B, 15B' between the input branch 14A or 14B and the conveying pipe 100A or 100B is opened and, correspondingly, the joint 17A, 17A' or 17B, 17B' between the output branch 16A or 16B and the suction pipe 25 coming from the partial-vacuum source 21 is opened, the collection container 11A or 11B can be lifted with lifting means 50, 51, 52 from above out of the open external container 12A or 12B for emptying.

When it is desired to feed in wastes of large size, which do not fit into the conveying piping, a filling aperture 9 can be made in the collection container 11A, e.g. in the top part of the container. The filling aperture of the collection container is provided with a hatch 19.

In the embodiment of FIGS. 1-9 and 11, the collection container 11A, 11B of the separating device has in its top part a top wall 34, the edge areas of which can slope downwards towards the outer edge. In one embodiment, the edge of the top wall can extend to outside the wall 11' of the collection container 11A, 11B, forming an eave. According to one embodiment, the edges of the top wall can extend to outside the rim formed by the wall 4 of the external container 12A, 12B as viewed from above. An input aperture 9, in which can be an openable and closable hatch 19 for feeding material directly into the collection container, can be formed in the top wall 34. Lifting means 50, 51, 52, such as a lifting lug 50, can be arranged on the top wall for lifting, to which lifting means a lifting sling, lifting cable or lifting chain 51 can be fastened and then lifted with the lifting hook 52 of the hoisting device. The lifting phase is presented in FIG. 11.

The diameter of the external container 12A, 12B can, of course, range according to the point of application, e.g. between 1000-3000 mm. According to one embodiment, in the deep collection container, i.e. the external container 12A, 12B of the separating device 10A, 10B according to the invention, the depth of embedding, i.e. the distance of the base of the container from the surface S of the ground, can range according to the point of application, e.g. between 2000-4000 mm. When the collection container 11A, 11B is a deep collection container according to the invention, the material $W_A$, $W_B$ that has collected in the container is compressed more densely in the container when the amount of material in the container increases. Owing to this, space can be saved, the separating device can be made suitable for environment and the emptying of it is convenient to perform.

The invention thus relates to a method for handling material and conveying air in a pneumatic conveying system for material, which conveying system comprises at least one input point 1 for material, a material conveying pipe 100, which is connectable to an input point 1, and at least two separating devices 10A, 10B, in which the material being conveyed is separated from the conveying air, and also means for bringing about a pressure difference and/or a transporting air flow in the conveying pipe 100 at least during the conveyance of material, which means comprise at least one partial-vacuum source 21. In the method, material is conveyed in a transporting air flow in a material conveying pipe from an input point in a selected manner into one of at least two separating devices 10A, 10B such that at least one of the aforementioned separating devices 10A, 10B is configured to function as the standby separating device of a second separating device.

According to one embodiment, in the method the first separating device 10A and the second separating device 10B are configured to be operatively connected in an interchangeable manner in such a way that the second separating device 10B functions as a standby separating device for the first separating device 10A, and/or that the first separating device 10A functions as a standby separating device for the second separating device 10B.

According to one embodiment, in the method the first separating device 10A and the second separating device 10B are configured to be operatively connected in such a way that the second separating device 10B functions as a standby separating device for the first separating device 10A, in which case the input channel 14A of the first separating device is operatively connected to the material conveying pipe 100 and the output channel 16A for conveying air of the first separating device 10A is operatively connected via the material pathway 16A14B to the input channel 14B of the second separating device 10B and the output channel 16B for conveying air of the second separating device 10B is operatively connected to the channel 25 leading to the suction side of the partial-vacuum source 21 of the pneumatic material conveying system.

According to one embodiment, in the method the second separating device 10B and the first separating device 10A are configured to be operatively connected in such a way that the first separating device 10A functions as a standby separating device for the second separating device 10B, in which case the input channel 14B of the second separating device 10B is operatively connected to the material conveying pipe 100 and the output channel 16B for conveying air of the second separating device 10B is operatively connected via the material pathway 16614A to the input channel 14A of the first separating device 10A and the output channel 16A for conveying air of the first separating device 10A is operatively connected to the channel 25 leading to the suction side of the partial-vacuum source 21 of the pneumatic material conveying system.

According to one embodiment, in the method the first separating device 10A and the second separating device 10B are configured to be operatively connected in an interchangeable manner in such a way that the second separating device 10B functions as a standby separating device for the first separating device 10A, in which case the input channel 14A of the first separating device is operatively connected to the material conveying pipe 100 and the output channel 16A for conveying air of the first separating device 10A is operatively connected via the material pathway 16A14B to the input channel 14B of the second separating device 10B and the output channel 16B for conveying air of the second separating device 10B is operatively connected to the channel 25 leading to the suction side of the partial-vacuum source 21 of the pneumatic material conveying system, or, that the first separating device 10A functions as a standby separating device for the second separating device 10B, in which case the input channel 14B of the second separating device 10B is operatively connected to the material conveying pipe 100 and the output channel 16B for conveying air of the second separating device 10B is operatively connected via the material pathway 16614A to the input channel 14A of the first separating device 10A and the output channel 16A for conveying air of the first separating device 10A is operatively connected to the channel 25 leading to the suction side of the partial-vacuum source 21 of the pneumatic material conveying system.

According to one embodiment, material pathways 100A, 100B are arranged between the material conveying pipe 100 and the input channel 14A of the first separating device and also between the material conveying pipe and the input channel 14B of the second separating device 10B, which material pathways are provided with at least one valve means 109 in such a way that the pathway from the material conveying pipe 100 to the input channel 14A of the first separating device 10A and/or to the input channel 14B of the second separating device 10B is openable and closable.

According to one embodiment, a pathway is arranged between the channel 25 leading to the suction side of the partial-vacuum source and the output channel 16A for conveying air of the first separating device 10A, and/or a pathway is arranged between the channel 25 leading to the suction side of the partial-vacuum source and the output channel 16B for conveying air of the second separating device 10B, which pathway is provided with a valve means 112A, 112B in such a way that the pathway from the channel 25 leading to the suction side of the partial-vacuum source to the output channel 14A for conveying air of the first separating device 10A and/or to the output channel 14B for conveying air of the second separating device 10B is openable and closable.

According to one embodiment, the pathway 16A14B from the output channel 16A for conveying air of the first separating device 10A into the input channel 14B of the second separating device 10B is openable and closable with a valve means 111A.

According to one embodiment, the pathway 16614A from the output channel 16B for conveying air of the second separating device 10B into the input channel 14A of the first separating device 10A is openable and closable with a valve means 111B.

According to one embodiment, the first separating device 10A and/or the second separating device 10B is a cyclone separator in regard to its operating principle.

According to one embodiment, the first separating device 10A and/or the second separating device 10B is a separator container, e.g. a horizontal separator container.

According to one embodiment, the downstream separating device in the direction of travel of the conveying air, i.e. the standby separating device, receives material particles that have traveled along with the conveying air through the upstream separating device in the direction of travel of the conveying air, and separates these particles from the conveying air.

According to one embodiment, the first separating device 10A and/or the second separating device 10B is a deep collection container-separating device, the collection container 11A, 11B of which is lifted in the emptying phase with lifting means and the material w that has collected in the collection container 11A, 11B is emptied via an openable and closable aperture 6 arranged in the collection container 11A, 11B.

According to one embodiment, in the method the collection container 11A, 11B of a separating device 10A, 10B is emptied into the container space of a transport means, in which container space the material is possibly compressed to be denser, and which transport means transports the material away.

According to one embodiment, the collection container 11A, 11B of a separating device 10A, 10B is lifted in the emptying phase from the external container 12A, 12B, in which it is at least partly, and after the emptying phase the emptied collection container 11A, 11B is lowered back into the external container 12A, 12B.

According to one embodiment, material is fed into the collection container 11A, 11B of a separating device 10A, 10B also directly, from an input aperture 9 arranged in the top part of the container.

According to one embodiment, in the method material is fed into a conveying pipe 100 from the input points 1 of material, which are input points for waste, such as waste receptacles or refuse chutes.

According to one embodiment, in the method a first material $W_A$ is conveyed into the first separating device 10A and a second material $W_B$ is conveyed into the second separating device 10B.

According to one embodiment, in the method the same material or different material is conveyed into the first separating device 10A and into the second separating device 10B.

According to one embodiment, in the method the material conveying system is a waste conveying system.

The object of the invention is also a separating device arrangement for a pneumatic material conveying system, in which material conveying system material is intended to be conveyed in a transporting air flow in a selected manner into one of at least two separating devices 10A, 10B, which separating device arrangement comprises at least two separating devices 10A, 10B, in each of which is an input aperture 14' for material and for the conveying air, and an output aperture 16' for conveying air, and comprises switching means for conducting the transporting air flow and material of the material conveying pipe 100 from the conveying pipe in a selected manner into the input aperture 14' of each separating device 10A, 10B, and means for connecting the suction aperture 16' of the separating device to the suction side of the partial-vacuum source 21. At least one of the aforementioned separating devices 10A, 10B is configured to function as the standby separating device of a second separating device.

According to one embodiment, the first separating device 10A and the second separating device 10B are configured to be operatively connected in an interchangeable manner in such a way that the second separating device 10B is configured to function as a standby separating device for the first separating device 10A, and/or, that the first separating device 10A is configured to function as a standby separating device for the second separating device 10B.

According to one embodiment, the first separating device 10A and the second separating device 10B are configured to be operatively connected in such a way that the second separating device 10B is configured for functioning as a standby separating device for the first separating device 10A, in which case the input channel 14A leading to the input aperture of the first separating device is configured to be operatively connected to the material conveying pipe 100 and the output channel 16A leading from the output aperture for conveying air of the first separating device 10A is configured to be operatively connected via the material pathway 16A14B to the input channel 14B leading to the input aperture of the second separating device 10B and the output channel 16B leading from the output aperture for conveying air of the second separating device 10B is configured to be operatively connected to the channel 25 leading to the suction side of the partial-vacuum source 21 of the pneumatic material conveying system.

According to one embodiment, the second separating device 10B and the first separating device 10A are configured to be operatively connected in such a way that the first separating device 10A is configured to function as a standby separating device for the second separating device 10B, in which case the input channel 14B leading to the input aperture of the second separating device 10B is configured to be operatively connected to the material conveying pipe 100 and the output channel 16B leading from the output aperture for conveying air of the second separating device 10B is configured to be operatively connected via the material pathway 16614A to the input channel 14A leading to the input aperture of the first separating device 10A and the output channel 16A leading from the output aperture for conveying air of the first separating device 10A is configured to be operatively connected to the channel 25 leading to the suction side of the partial-vacuum source 21 of the pneumatic material conveying system.

According to one embodiment, the first separating device 10A and the second separating device 10B are configured to be operatively connected in an interchangeable manner in such a way that the second separating device 10B is configured to function as a standby separating device for the first separating device 10A, in which case the input channel 14A leading to the input aperture of the first separating device is configured to be operatively connected to the material conveying pipe 100 and the output channel 16A leading from the output aperture for conveying air of the first separating device 10A is configured to be operatively connected via the material pathway 16A14B to the input channel 14B leading to the input aperture of the second separating device 10B and the output channel 16B leading from the output aperture for conveying air of the second separating device 10B is configured to be operatively connected to the channel 25 leading to the suction side of the partial-vacuum source 21 of the pneumatic material conveying system, or, that the first separating device 10A is configured to function as a standby separating device for the second separating device 10B, in which case the input channel 14B leading to the input aperture of the second separating device 10B is configured to be operatively connected to the material conveying pipe 100 and the output channel 16B leading from the output aperture for conveying air of the second separating device 10B is configured to be operatively connected via the material pathway 16614A to the input channel 14A leading to the input aperture of the first separating device 10A and the output channel 16A leading from the output aperture for conveying air of the first separating device 10A is configured to be operatively connected to the channel 25 leading to the suction side of the partial-vacuum source 21 of the pneumatic material conveying system.

According to one embodiment, material pathways 100A, 100B are arranged between the input channel 14A connecting the material conveying pipe 100 to the input aperture of the first separating device and also between the input channel 14B connecting the material conveying pipe 100 to the input aperture of the second separating device 10B, which pathways are provided with a valve means 109 in such a way that the pathway from the material conveying pipe 100 to the input channel 14A of the first separating device 10A and/or to the input channel 14B of the second separating device 10B is openable and closable.

According to one embodiment, a valve means 111A is arranged in the material pathway 16A14B arranged between the output channel 16A leading from the output aperture for conveying air of the first separating device 10A and the input channel 14B leading to the input aperture of the second separating device 10B.

According to one embodiment, a valve means 111B is arranged in the material pathway 16614A arranged between the output channel 16B leading from the output aperture for conveying air of the second separating device 10B and the input channel 14A leading to the input aperture of the first separating device 10A.

According to one embodiment, a pathway is arranged between the channel 25 leading to the suction side of the partial-vacuum source 21 and the output channel 16A leading from the output aperture for conveying air of the first separating device 10A and/or between the channel 25 and the output channel 16B leading from the output aperture for conveying air of the second separating device 10B, which pathway is provided with a valve means 112A, 112B in such a way that the pathway from the channel 25 leading to the suction side of the partial-vacuum source 21 to the output channel 14A connecting to the output aperture for conveying air of the first separating device 10A and/or to the output channel 14B connecting to the output aperture for conveying air of the second separating device 10B is openable and closable.

According to one embodiment, the first separating device 10A and/or the second separating device 10B is a cyclone separator in regard to its operating principle.

According to one embodiment, the first separating device 10A and/or the second separating device 10B is a separator container, e.g. a horizontal separator container.

According to one embodiment, the downstream separating device in the direction of travel of the conveying air, i.e. the standby separating device, is configured to receive material particles that have traveled along with the conveying air through the upstream separating device in the direction of travel of the conveying air, and to separate these particles from the conveying air.

According to one embodiment, the first separating device 10A and/or the second separating device 10B is a deep collection container-separating device that in the emptying phase of the collection container 11A, 11B is lifted with lifting means and the material w that has collected in the collection container 11A, 11B is emptied via an openable and closable aperture 6 arranged in the collection container 11A, 11B.

According to one embodiment, the first separating device 10A or the second separating device 10B comprises an actual collection container 11A, 11B and an external container 12A, 12B.

According to one embodiment, in the top part of the collection container 11A, 11B is an input aperture 9.

The object of the invention is also a waste conveying system, which comprises at least one input point 1 for waste material, a material conveying pipe 100, which is connectable to an input point 1, and a separating device or container 11, in which the material to be conveyed is separated from the conveying air, and also means for bringing about a pressure difference and/or a transporting air flow in the conveying pipe 100 at least during the conveyance of material, which means comprise at least one partial-vacuum source 21. The waste conveying system comprises a separating device arrangement as defined in any of the aforementioned characteristic features.

In the system and method according to the invention the mobile partial-vacuum source presented e.g. in publication WO2011151522, or an ordinary partial-vacuum source arranged in the proximity of the separating device, e.g. arranged in a container, can be used. The deep collection separating device according to specification WO2014029903 can, for example, be applied as a separating device of the separating device arrangement for a waste conveying system. The waste container/separating device, and its connections, presented in specification WO2014135746 can, for example, be applied as the separator container, and in the connections, in the embodiment of FIG. 10.

It is obvious to the person skilled in the art that the invention is not limited to the embodiments presented above, but that it can be varied within the scope of the claims presented below. The characteristic features possibly presented in the description in conjunction with other characteristic features can also, if necessary, be used separately to each other.

The invention claimed is:

1. A method for handling material and conveying air in a pneumatic conveying system for material, which conveying system comprises at least one input point for material, a material conveying pipe, which is connectable to an input point, and at least two separating devices, in which the material being conveyed is separated from the conveying air, and also means for bringing about a pressure difference and/or a transporting air flow in the conveying pipe at least during the conveyance of material, which means comprise at least one partial-vacuum source, wherein in the method material is conveyed in a transporting air flow in a material conveying pipe from an input point in a selected manner into one of at least two separating devices, and in that at least one of the aforementioned separating devices is configured to function as the standby separating device of a second separating device,
wherein in the method material is fed into a conveying pipe from the input points for material, which are the input points for waste,
wherein in the method the material conveying system is a waste conveying system, and
wherein in the method the first separating device and the second separating device are configured to be operatively connected in such a way that the second separating device functions as a standby separating device for the first separating device, in which case the input channel of the first separating device is operatively connected to the material conveying pipe and the output channel for conveying air of the first separating device is operatively connected via the material pathway to the input channel of the second separating device and the output channel for conveying air of the second separating device is operatively connected to the channel leading to the suction side of the partial-vacuum source of the pneumatic material conveying system.

2. Method according to claim 1, wherein in the method the first separating device and the second separating device are configured to be operatively connected in an interchangeable manner in such a way
that the second separating device functions as a standby separating device for the first separating device, and/or
that the first separating device functions as a standby separating device for the second separating device.

3. Method according to claim 1, wherein in the method the second separating device and the first separating device are configured to be operatively connected in such a way that the first separating device functions as a standby separating device for the second separating device, in which case the input channel of the second separating device is operatively connected to the material conveying pipe and the output channel for conveying air of the second separating device is operatively connected via the material pathway to the input channel of the first separating device and the output channel for conveying air of the first separating device is operatively connected to the channel leading to the suction side of the partial-vacuum source of the pneumatic material conveying system.

4. Method according to claim 1, wherein in the method the first separating device and the second separating device are configured to be operatively connected in an interchangeable manner in such a way that the second separating device functions as a standby separating device for the first separating device, in which case the input channel of the first separating device is operatively connected to the material conveying pipe and the output channel for conveying air of the first separating device is operatively connected via the material pathway to the input channel of the second separating device and the output channel for conveying air of the second separating device is operatively connected to the channel leading to the suction side of the partial-vacuum source of the pneumatic material conveying system,
or,
that the first separating device functions as a standby separating device for the second separating device, in which case the input channel of the second separating device is operatively connected to the material conveying pipe and the output channel for conveying air of the second separating device is operatively connected via the material pathway to the input channel of the first separating device and the output channel for conveying air of the first separating device is operatively connected to the channel leading to the suction side of the partial-vacuum source of the pneumatic material conveying system.

5. Method according to claim 1, wherein material pathways are arranged between the material conveying pipe and the input channel of the first separating device and also between the material conveying pipe and the input channel of the second separating device, which material pathways are provided with at least one valve means in such a way that the pathway from the material conveying pipe to the input channel of the first separating device and/or to the input channel of the second separating device is openable and closable.

6. Method according to claim 1, wherein a pathway is arranged between the channel leading to the suction side of the partial-vacuum source and the output channel for conveying air of the first separating device, and/or a pathway is arranged between the channel leading to the suction side of the partial-vacuum source and the output channel for conveying air of the second separating device, which pathway is provided with a valve means n such a way that the pathway from the channel leading to the suction side of the partial-vacuum source to the output channel for conveying air of the first separating device and/or to the output channel for conveying air of the second separating device is openable and closable.

7. Method according to claim 1, wherein the pathway from the output channel for conveying air of the first separating device into the input channel of the second separating device s openable and closable with a valve means.

8. Method according to claim 1, wherein the pathway from the output channel for conveying air of the second separating device into the input channel of the first separating device is openable and closable with a valve means.

9. Method according to claim 1, wherein the first separating device and/or the second separating device is a cyclone separator in regard to its operating principle.

10. Method according to claim 1, wherein the first separating device and/or the second separating device is a separator container.

11. Method according to claim 1, wherein the downstream separating device in the direction of travel of the conveying air, receives material particles that have traveled along with the conveying air through the upstream separating device in the direction of travel of the conveying air, and separates these particles from the conveying air.

12. Method according to claim 1, wherein the first separating device and/or the second separating device is a deep collection container-separating device, the collection container of which is lifted in the emptying phase with lifting means and the material that has collected in the collection container is emptied via an openable and closable aperture arranged in the collection container.

13. Method according to claim 1, wherein in the method the collection container of a separating device is emptied into the container space of a transport means, in which container space the material is possibly compressed to be denser, and which transport means transports the material away.

14. Method according to claim 1, wherein the collection container of the separating device is lifted in the emptying phase from the external container, in which it is at least partly, and after the emptying phase the emptied collection container is lowered back into the external container.

15. Method according to claim 1, wherein material is fed into the collection container of the separating device also directly, from an input aperture arranged in the top part of the container.

16. Method according to & claim 1, wherein in the method a first material is conveyed into the first separating device and a second material is conveyed into the second separating device.

17. Method according to claim 1, wherein in the method the same material or different material is conveyed into the first separating device and into the second separating device.

18. Waste conveying system, which comprises at least one input point for waste material, a material conveying pipe, which is connectable to an input point, and a separating device or container, in which the material to be conveyed is separated from the conveying air, and also means for bringing about a pressure difference and/or a transporting air flow in the conveying pipe at least during the conveyance of material, which means comprise at least one partial-vacuum source, wherein the system comprises a separating device arrangement for a pneumatic material conveying system, in which material conveying system material is intended to be conveyed in a transporting air flow in a selected manner into one of at least two separating devices, which separating device arrangement comprises at least two separating devices, in each of which is an input aperture for material and for the conveying air, and an output aperture for the conveying air, and comprises switching means for conducting the transporting air flow and material of the material conveying pipe from the conveying pipe in a selected manner into the input aperture of each separating device, and means for connecting the suction aperture of a separating device to the suction side of the partial-vacuum source, wherein at least one of the aforementioned separating devices is configured to function as the standby separating device of a second separating device, wherein the first separating device and the second separating device are configured to be operatively connected in such a way that the second separating device is configured for functioning as a standby separating device for the first separating device, in which case the input channel leading to the input aperture of the first separating device is configured to be operatively connected to the material conveying pipe and the output channel leading from the output aperture for conveying air of the first separating device is configured to be operatively connected via the material pathway to the input channel leading to the input aperture of the second separating device and the output channel leading from the output aperture for conveying air of the second separating device is configured to be operatively connected to the channel leading to the suction side of the Partial-vacuum source of the pneumatic material conveying system.

19. Waste conveying system according to claim 18, wherein the first separating device and the second separating device are configured to be operatively connected in an interchangeable manner in such a way
that the second separating device is configured to function as a standby separating device for the first separating device,
and/or,
that the first separating device is configured to function as a standby separating device for the second separating device.

20. Waste conveying system which comprises at least one input point for waste material, a material conveying pipe, which is connectable to an input point, and a separating device or container, in which the material to be conveyed is separated from the conveying air, and also means for bringing about a pressure difference and/or a transporting air flow in the conveying pipe at least during the conveyance of material, which means comprise at least one partial-vacuum source, wherein the system comprises a separating device arrangement for a pneumatic material conveying system, in which material conveying system material is intended to be conveyed in a transporting air flow in a selected manner into one of at least two separating devices, which separating device arrangement comprises at least two separating devices, in each of which is an input aperture for material and for the conveying air, and an output aperture for the conveying air, and comprises switching means for conducting the transporting air flow and material of the material conveying pipe from the conveying pipe in a selected manner into the input aperture of each separating device, and means for connecting the suction aperture of a separating device to the suction side of the partial-vacuum source, wherein at least one of the aforementioned separating devices is configured to function as the standby separating device of a second separating device, wherein the second separating device-and the first separating device are configured to be operatively connected in such a way that the first separating device is configured to function as a standby separating device for the second separating device, in which case the input channel leading to the input aperture of the second separating device is configured to be operatively connected to the material conveying pipe and the output channel leading from the output aperture for conveying air of the second separating device is configured to be operatively connected via the material pathway to the input channel leading to the input aperture of the first separating device and the output channel leading from the output aperture for conveying air of the first separating device is configured to be operatively connected to the channel leading to the suction side of the partial-vacuum source of the pneumatic material conveying system.

21. Waste conveying system which comprises at least one input point for waste material, a material conveying pipe, which is connectable to an input point, and a separating device or container, in which the material to be conveyed is separated from the conveying air, and also means for bringing about a pressure difference and/or a transporting air flow in the conveying pipe at least during the conveyance of material, which means comprise at least one partial-vacuum source, wherein the system comprises a separating device arrangement for a pneumatic material conveying system, in which material conveying system material is intended to be conveyed in a transporting air flow in a selected manner into one of at least two separating devices, which separating device arrangement comprises at least two separating devices, in each of which is an input aperture for material and for the conveying air, and an output aperture for the conveying air, and comprises switching means for conducting the transporting air flow and material of the material conveying pipe from the conveying pipe in a selected manner into the input aperture of each separating device, and means for connecting the suction aperture of a separating device to the suction side of the partial-vacuum source, wherein at least one of the aforementioned separating devices is configured to function as the standby separating device of a second separating device, wherein the first separating device and the second separating device are configured to be operatively connected in an interchangeable manner in such a way that the second separating device is configured to function as a standby separating device for the first separating device, in which case the input channel leading to the input aperture of the first separating device is configured to be operatively connected to the material conveying pipe and the output channel leading from the output aperture for conveying air of the first separating device is configured to be operatively connected via the material pathway to the input channel leading to the input aperture of the second separating device and the output channel leading from the output aperture for conveying air of the second separating device is configured to be operatively connected to the channel leading to the suction side of the partial-vacuum source of the pneumatic material conveying system, or, that the first separating device is configured to function as a standby separating device for the second separating device, in which case the input channel leading to the input aperture of the second separating device is configured to be operatively connected to the material conveying pipe and the output channel leading from the output aperture for conveying air of the second separating device is configured to be operatively connected via the material pathway to the input channel leading to the input aperture of the first separating device and the output channel leading from the output aperture for conveying air of the first separating device is configured to be operatively connected to the channel leading to the suction side of the partial-vacuum source of the pneumatic material conveying system.

22. Waste conveying system according to claim 18, wherein material pathways are arranged between the input channel connecting the material conveying pipe to the input aperture of the first separating device and also between the input channel connecting the material conveying pipe to the input aperture of the second separating device, which material pathways are provided with a valve means in such a way that the pathway from the material conveying pipe to the input channel of the first separating device and/or to the input channel of the second separating device is openable and closable.

23. Waste conveying system, which comprises at least one input point for waste material, a material conveying pipe, which is connectable to an input point, and a separating device or container, in which the material to be conveyed is separated from the conveying air, and also means for bringing about a pressure difference and/or a transporting air flow in the conveying pipe at least during the conveyance of material, which means comprise at least one partial-vacuum source, wherein the system comprises a separating device arrangement for a pneumatic material conveying system, in which material conveying system material is intended to be conveyed in a transporting air flow in a selected manner into one of at least two separating devices, which separating device arrangement comprises at least two separating devices, in each of which is an input aperture for material and for the conveying air, and an output aperture for the conveying air, and comprises switching means for conducting the transporting air flow and material of the material conveying pipe from the conveying pipe in a selected manner into the input aperture of each separating device, and means for connecting the suction aperture of a separating device to the suction side of the partial-vacuum source, wherein at least one of the aforementioned separating devices is configured to function as the standby separating device of a second separating device, wherein a valve means is arranged in the material pathway arranged between the output channel leading from the output aperture for conveying air of the first separating device and the input channel leading to the input aperture of the second separating device.

24. Waste conveying system, which comprises at least one input point for waste material, a material conveying pipe, which is connectable to an input point, and a separating device or container, in which the material to be conveyed is separated from the conveying air, and also means for bringing about a pressure difference and/or a transporting air flow in the conveying pipe at least during the conveyance of material, which means comprise at least one partial-vacuum source, wherein the system comprises a separating device arrangement for a pneumatic material conveying system, in which material conveying system material is intended to be conveyed in a transporting air flow in a selected manner into one of at least two separating devices, which separating device arrangement comprises at least two separating devices, in each of which is an input aperture for material and for the conveying air, and an output aperture for the conveying air, and comprises switching means for conducting the transporting air flow and material of the material conveying pipe from the conveying pipe in a selected manner into the input aperture of each separating device, and means for connecting the suction aperture of a separating device to the suction side of the partial-vacuum source, wherein at least one of the aforementioned separating devices is configured to function as the standby separating device of a second separating device, wherein a valve means is arranged in the material pathway arranged between the output channel leading from the output aperture for conveying air of the second separating device and the input channel leading to the input aperture of the first separating device.

25. Waste conveying system according to claim 18, wherein a pathway is arranged between the channel leading to the suction side of the partial-vacuum source and the output channel leading from the output aperture for conveying air of the first separating device and/or between the channel and the output channel leading from the output aperture for conveying air of the second separating device, which pathway is provided with a valve means in such a way that the pathway from the channel leading to the suction side of the partial-vacuum source to the output channel connecting to the output aperture for conveying air of the first separating device and/or to the output channel connecting to the output aperture for conveying air of the second separating device is openable and closable.

26. Waste conveying system according to claim 18, wherein the first separating device and/or the second separating device is a cyclone separator in regard to its operating principle.

27. Waste conveying system according to claim 18, wherein the first separating device and/or the second separating device is a separator container.

28. Waste conveying system, which comprises at least one input point for waste material, a material conveying pipe, which is connectable to an input point, and a separating device or container, in which the material to be conveyed is separated from the conveying air, and also means for bringing about a pressure difference and/or a transporting air flow in the conveying pipe at least during the conveyance of material, which means comprise at least one partial-vacuum source, wherein the system comprises a separating device arrangement for a pneumatic material conveying system, in which material conveying system material is intended to be conveyed in a transporting air flow in a selected manner into one of at least two separating devices, which separating device arrangement comprises at least two separating devices, in each of which is an input aperture for material and for the conveying air, and an output aperture for the conveying air, and comprises switching means for conducting the transporting air flow and material of the material conveying pipe from the conveying pipe in a selected manner into the input aperture of each separating device, and means for connecting the suction aperture of a separating device to the suction side of the partial-vacuum source, wherein at least one of the aforementioned separating devices is configured to function as the standby separating device of a second separating device, wherein the downstream separating device in the direction of travel of the conveying air is configured to receive material particles that have traveled along with the conveying air through the upstream separating device in the direction of travel of the conveying air, and to separate these particles from the conveying air.

29. Waste conveying system according to claim 18, wherein the first separating device and/or the second separating device is a deep collection container-separating device that in the emptying phase of the collection container is lifted with lifting means and the material that has collected in the collection container is emptied via an openable and closable aperture arranged in the collection container.

30. Waste conveying system according to claim 18, wherein the first separating device or the second separating device comprises an actual collection container and an external container.

31. Waste conveying system according to claim 18, wherein in the top part of the collection container is an input aperture.

32. Method according to claim 1, wherein the input points for waste comprise waste receptacles or refuse chutes.

33. Method according to claim 10, wherein the separator container comprises a horizontal separator container.

34. Method according to claim 11, wherein the downstream separating device in the direction of travel of the conveying air comprises a standby separating device.

35. Waste conveying system according to claim 27, wherein the separator container comprises a horizontal separator container.

36. Waste conveying system according to claim 28, wherein the downstream separating device in the direction of travel of the conveying air comprises a standby separating device.

* * * * *